US012623368B2

(12) United States Patent
Sinha et al.

(10) Patent No.: US 12,623,368 B2
(45) Date of Patent: May 12, 2026

(54) SYSTEMS AND METHODS OF AUTOMATIC FILM REMOVAL

(71) Applicant: General Electric Company, Schenectady, NY (US)

(72) Inventors: Shatil Sinha, Clifton Park, NY (US); Younkoo Jeong, Clifton Park, NY (US); Matthew Hockemeyer, Ballston Spa, NY (US); Chen Zhang, Albany, NY (US); Anirban Sinha, Schenectady, NY (US)

(73) Assignee: General Electric Company, Evendale, OH (US)

( * ) Notice: Subject to any disclaimer, the term of this patent is extended or adjusted under 35 U.S.C. 154(b) by 110 days.

(21) Appl. No.: 18/491,887

(22) Filed: Oct. 23, 2023

(65) Prior Publication Data

US 2025/0128444 A1     Apr. 24, 2025

(51) Int. Cl.
      *B32B 43/00*          (2006.01)
      *B26D 3/28*           (2006.01)
(52) U.S. Cl.
      CPC ........... *B26D 3/282* (2013.01); *B32B 43/006* (2013.01); *Y10T 156/1132* (2015.01); *Y10T 156/1179* (2015.01); *Y10T 156/1944* (2015.01); *Y10T 156/1989* (2015.01)
(58) Field of Classification Search
      CPC ............. B32B 43/006; Y10T 156/1132; Y10T 156/1179; Y10T 156/1944; Y10T 156/1989
      See application file for complete search history.

(56) References Cited

U.S. PATENT DOCUMENTS

| | | | |
|---|---|---|---|
| 9,358,770 | B2 | 6/2016 | Dong et al. |
| 9,427,949 | B2 | 8/2016 | Ohno et al. |
| 9,517,615 | B2 | 12/2016 | Dong et al. |
| 9,731,492 | B2 | 8/2017 | Lee et al. |
| 9,793,518 | B2 | 10/2017 | Choi et al. |
| 10,207,487 | B1 | 2/2019 | Hockemeyer et al. |
| 10,647,102 | B2 | 5/2020 | Filipovic et al. |
| 2014/0209250 | A1 | 7/2014 | Kawagoe et al. |
| 2015/0314584 | A1* | 11/2015 | Dong .................... B32B 43/006 156/701 |

(Continued)

FOREIGN PATENT DOCUMENTS

| | | |
|---|---|---|
| JP | H01317767 A | 12/1989 |

*Primary Examiner* — Philip C Tucker
*Assistant Examiner* — Nickolas R Harm
(74) *Attorney, Agent, or Firm* — Dority & Manning, P.A.

(57) ABSTRACT

A backing film removal system comprises a separating mechanism configured to separate a first portion of a first backing film on a first side of a material segment and a second portion of a second backing film on a second side of the material segment from a material layer of the material segment, wherein the second side is opposite the first side. The backing film removal system also includes a clamping mechanism that is actuatable to apply a clamping force to secure the material layer and the second portion together. A separator assembly includes a gripping mechanism configured to grip the first portion. At least one of the gripping mechanism or the clamping mechanism is movable to draw the first portion gripped by the gripping mechanism away from the material layer to remove a remaining portion of the first backing film from the material layer.

20 Claims, 9 Drawing Sheets

(56) References Cited

U.S. PATENT DOCUMENTS

| | | |
|---|---|---|
| 2017/0326865 A1 | 11/2017 | Ayabe et al. |
| 2019/0009513 A1 | 1/2019 | Filipovic et al. |
| 2022/0134634 A1 | 5/2022 | Choi et al. |
| 2023/0278324 A1 | 9/2023 | Greaney et al. |

* cited by examiner

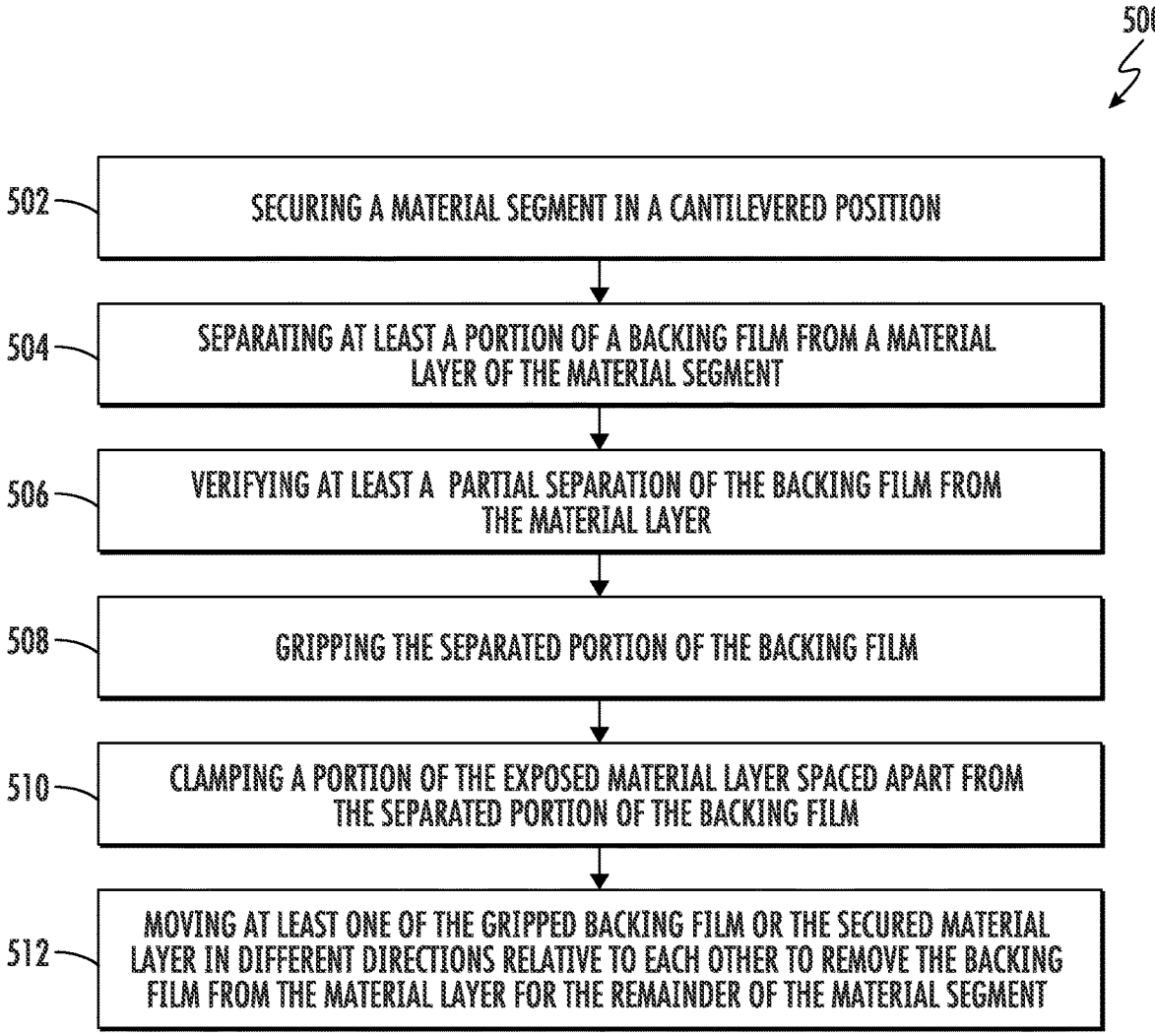

*500*

| | |
|---|---|
| 502 | SECURING A MATERIAL SEGMENT IN A CANTILEVERED POSITION |
| 504 | SEPARATING AT LEAST A PORTION OF A BACKING FILM FROM A MATERIAL LAYER OF THE MATERIAL SEGMENT |
| 506 | VERIFYING AT LEAST A PARTIAL SEPARATION OF THE BACKING FILM FROM THE MATERIAL LAYER |
| 508 | GRIPPING THE SEPARATED PORTION OF THE BACKING FILM |
| 510 | CLAMPING A PORTION OF THE EXPOSED MATERIAL LAYER SPACED APART FROM THE SEPARATED PORTION OF THE BACKING FILM |
| 512 | MOVING AT LEAST ONE OF THE GRIPPED BACKING FILM OR THE SECURED MATERIAL LAYER IN DIFFERENT DIRECTIONS RELATIVE TO EACH OTHER TO REMOVE THE BACKING FILM FROM THE MATERIAL LAYER FOR THE REMAINDER OF THE MATERIAL SEGMENT |

FIG. 14

SYSTEMS AND METHODS OF AUTOMATIC FILM REMOVAL

TECHNICAL FIELD

The present subject matter relates generally to materials having a film backing, or more particularly to systems and methods of automatic film removal.

BACKGROUND

Composite laminate components generally include a plurality of layers or plies of composite material assembled together to provide the composite component with improved engineering properties. Composite components are typically manufactured by stacking a plurality of plies on top of each other until a desired thickness and shape is achieved. For example, the manufacturing process typically includes cutting plies of composite material to a desired shape, stacking the plies layer by layer, compacting the plies after each additional ply is layered over the previously stacked plies, and then curing the material. The plies of composite material may be produced with a pre-impregnated resin, often referred to as a "prepreg," covered by a backing or protective film (e.g., a polyfilm) extending over one or more sides of the plies that facilitate the handling of the material prior to or during layup. During manufacture of composite components, the backing film is removed from the plies of composite material.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 14 is a block diagram depicting an embodiment of a method of automatically removing a backing film from a composite material segment in accordance with various aspects of the present disclosure.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
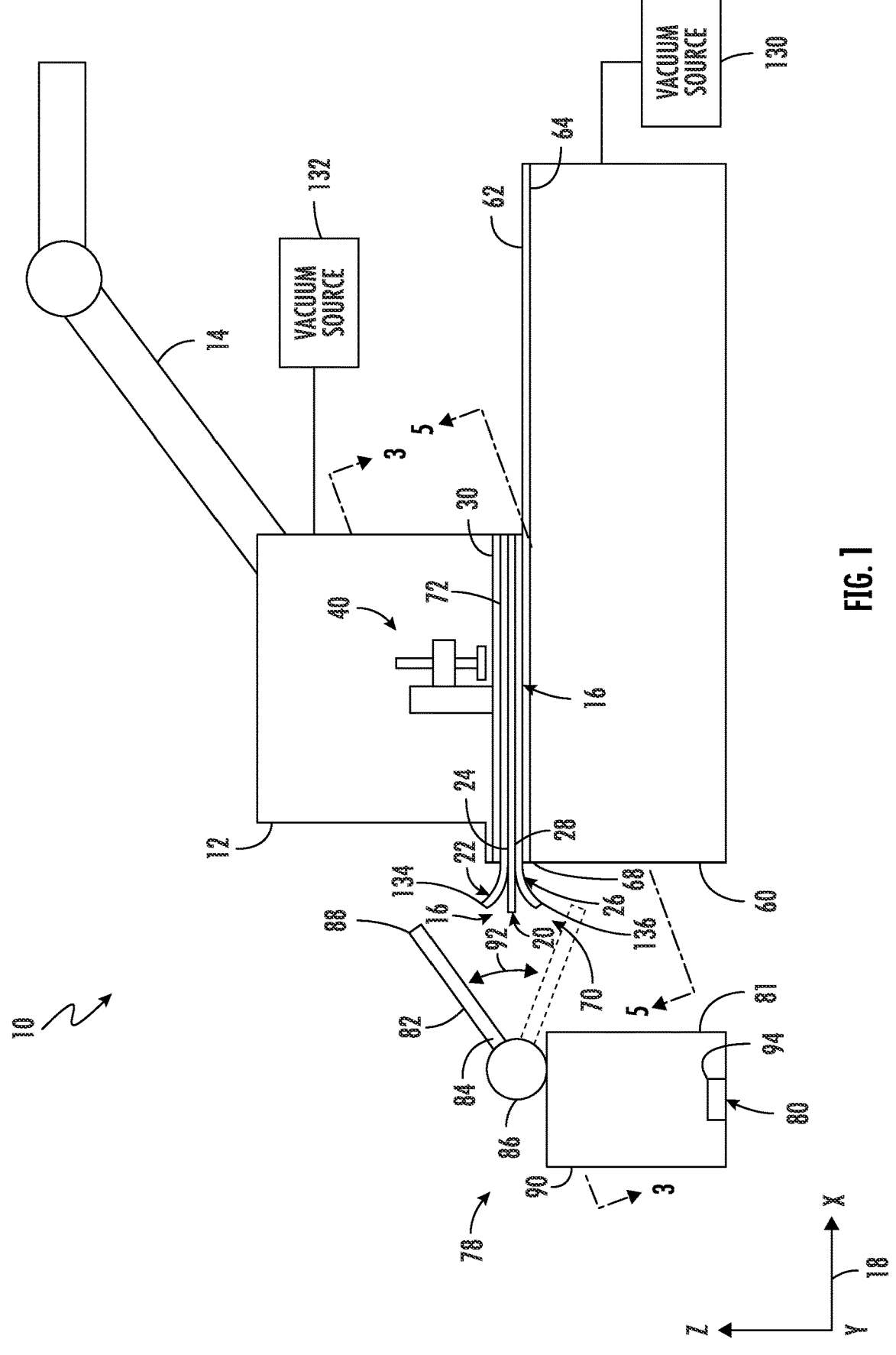
FIG. 1 is a schematic view of an exemplary embodiment of a system for automatic film removal according to the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The following description is provided to enable those skilled in the art to make and use the described embodiments contemplated for carrying out the disclosure. Various modifications, equivalents, variations, and alternatives, however, will remain readily apparent to those skilled in the art. Any and all such modifications, variations, equivalents, and alternatives are intended to fall within the scope of the present disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the disclosure as it is oriented in the drawing figures. However, it is to be understood that the disclosure may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first" and "second" may be used interchangeably to distinguish one component from another and are not intended to signify location or importance of the individual components.

The singular forms "a", "an", and "the" include plural references unless the context clearly dictates otherwise.

As used herein, the term "composite material" refers to a material produced from two or more constituent materials, wherein at least one of the constituent materials is a non-metallic material. Example composite materials include polymer matrix composites (PMC), ceramic matrix composites (CMC), chopped fiber composite materials, etc.

Conventionally, removing the backing film(s) from the composite ply is a manual process performed by an individual. Thus, manually separating and removing the backing film(s) from the composite ply relies on the skill of the individual to ensure that the backing film is removed properly and swiftly. Further, sharp objects often are used in the manual process for releasing the backing film and subsequently removing the backing film from the composite ply. As such, manually releasing and removing the backing film(s) is tedious and may cause damage to the composite material. Further, manual processes may not be time and/or cost efficient for loosening and/or removing the backing film(s) from the composite material.

The present disclosure is generally related to systems and methods for automatic film removal from a composite material. Embodiments of the present disclosure provide systems and method for automatic backing film removal from a composite material segment. Embodiments of the present disclosure enable backing film removal without relying on a user attempting to physically grip a portion of the backing film. In exemplary embodiments, the present disclosure applies a bending force to a free portion of the material segment to take advantage of the different stiffnesses between the backing films and the material layer of the material segment to separate at least a portion of the backing films from the material layer. Embodiments of the present disclosure also apply various clamping or gripping mechanisms to prevent the unintended or premature removal of a backing film from another side of the material segment. By way of non-limiting example, this may be a side of the material segment opposite the side being laid up onto a composite component. Additionally, in exemplary embodiments, because portions of the backing film from both sides of the material segment may be at least partially separated from the material layer, before or after layup of the material segment onto a composite component, the backing film from the opposite side may be easily removed. For example, in some instances, the backing film from a side of the material segment opposite the layup side may remain on the material segment until after the material segment has been laid up onto the composite component. After being laid up onto the composite component, the remaining backing film must be removed from the material segment without damaging, contaminating, or disturbing the material layer. Exemplary embodiments of the present disclosure may be used to partially separate a portion of the backing ply opposite the layup side of the material segment to facilitate the easy removal of the backing ply from the non-layup side of the material segment.

Referring now to the drawings, wherein identical numerals indicate the same elements throughout the figures, specifically FIGS. 1, FIG. 1 is a schematic view of an exemplary system 10 for automatic film removal according to the present disclosure. In the illustrated embodiment, the system 10 comprises an end effector 12 coupled to a movable component 14 to enable the end effector 12 to be moved to selected positions to perform various functions associated with removing a backing film from a material segment 16 of a composite material. In exemplary embodiments, the end effector 12 comprises a peripheral device coupled or mounted to the movable component 14 to perform the functions described herein (i.e., end of arm tooling (EOAT). For example, the end effector 12 may be mechanical, electromechanical, magnetic, hydraulic, or pneumatic for manipulating or interacting with an object. Exemplary end effectors may include electric, pneumatic, mechanical, hydraulic, or magnetic grippers or clamping mechanisms for pick-and-place operations (e.g., motor-driven, pneumatically-controlled, or hydraulically-controlled fingers, forks, or hooks; suction cups or vacuum plates; electromagnets), sensors, cameras, or other types of process tools. In the illustrated embodiment, the end effector 12 comprises a vacuum platen 30 and a clamping mechanism 40. As will be further described below, a vacuum source 132 fluidically coupled or connected to the end effector 12 may be actuated to apply a vacuum through the vacuum platen 30.

In exemplary embodiments, the movable component 14 may comprise a six degree-of-freedom robotic arm or other type of structure for manipulating or moving the end effector 12 into desired positions or orientations for film removal operations, such as providing movement along three different axes and along three separate angles (about the three different axes). For example, the movable component 14 may be coupled to a base (not shown) fixedly coupled to a support structure, and the movable component 14 may comprise one or more arms coupled together by one or more joints where the one or more arms may be driven by one or motors or actuators and include sensors for position monitoring and control. Thus, in exemplary embodiments, as a non-limiting example, the movable component 14 may provide movement of the end effector 12 along the axis X, along the axis Y, and along the axis Z, and rotation of the end effector 12 around the axis X (or roll), around the axis Y (or pitch), and around the axis Z (or yaw), as indicated via the coordinate system 18. It should be understood that the movable component 14 may also be configured with fewer degrees of freedom of movement.

In the illustrated embodiment, the material segment 16 comprises a material layer 20 (e.g., a layer of the composite material comprising a preimpregnated or resin impregnated unidirectional or woven fiber) with a backing film 22 disposed on or against a top surface or side 24 of the material layer 20 and a backing film 26 disposed on a bottom surface or side 28 of the material layer 20 opposite the top side 24. The material segment 16 may comprise a segment of a larger composite ply that has been cut to a desired size or shape from a larger strip or roll of composite material to accommodate a particular application of the material segment 16 to form a layer of a composite component.

In the illustrated embodiment, the system 10 also comprises support assembly 60. Support assembly 60 includes a top surface 62 configured by way of non-limiting example in the form of a vacuum platen 64. As will be further described below, a vacuum source 130 fluidically coupled or connected to the support assembly 60 may be actuated to apply a vacuum through the vacuum platen 64. To facilitate backing ply removal from the material segment 16 using the system 10, the material segment 16 is placed or positioned on the vacuum platen 64, and the end effector 12 is positioned against the material segment 16, such that the material segment 16 is secured in a cantilevered position between the end effector 12 and the support assembly 60 (e.g., between vacuum platens 30 and 64). In the illustrated embodiment, the vacuum platen 64 comprises an edge 68 over which the material segment 16 extends when the material segment 16 is secured in the cantilevered position. Thus, in the cantilevered position, the material segment 16 comprises an unsupported or free portion 70 (i.e., the portion of the material segment 16 extending beyond the edge 68 of the vacuum platen 64) and a fixed portion 72 (i.e., the portion of the material segment secured between the end effector 12 and the support assembly 60). The material segment 16 may be secured between the end effector 12 and the support assembly 60 by a force or pressure applied by the end effector 12 toward the support assembly 60. It should also be understood that a vacuum may be applied via one or more of the vacuum platens 30 and 64 while the material segment 16 is secured in the cantilevered position.

In operation, the material segment 16 is placed between the end effector 12 and the support assembly 60 in the cantilevered position. In exemplary embodiments, system 10 is configured to first remove the backing film 26 from the material segment 16 to accommodate the bottom side 28 of the material layer 20 to be applied to a layup of a composite component. Accordingly, to achieve the foregoing, the material segment 16 is disposed between the end effector 12 and the support assembly 60 with the backing film 26 disposed against the support assembly 60. In exemplary embodiments, the vacuum source 130 may be actuated to apply a vacuum through the vacuum platen 64 of the support assembly 60, and the material segment 16 placed onto the vacuum platen 64 in a cantilevered position, or the material segment 16 may be placed onto the vacuum platen 64 in a cantilevered position and then the vacuum applied through the vacuum platen 64 of the support assembly 60 to retain the material segment in the desired position. Alternatively, the vacuum source 132 may be actuated to apply a vacuum through the vacuum platen 30 of the end effector 12 and the material segment 16 placed onto the vacuum platen 30 in a cantilevered position (e.g., with the backing film 22 disposed against the vacuum platen 30). The material segment 16 may also be placed against any support surface and then, with a vacuum applied through the vacuum platen 30 of the end effector 12, the end effector 12 may be moved to a position to "pick up" the material segment 16 from the support surface. Thus, it should be understood that a variety of methods may be used to initially locate the material segment 16 in the system 10 relative to the end effector 12 or the support assembly 60. As described above, the end effector 12 is placed against the support assembly 60 such that the material segment 16 is disposed between the end effector 12 and the support assembly 60 (e.g., between the vacuum platens 30 and 64) in a cantilevered position. It should be understood that once the end effector 12 has been positioned against the support assembly 60 with the material segment 16 disposed therebetween, the vacuum applied to one or more of the vacuum platens 30 or 64 may be discontinued or may be maintained.

In the illustrated embodiment, the system 10 further comprises one or more separating mechanisms 78 to at least partially separate at least a portion of the backing film 26 from the material layer 20 of the material segment 16. For example, in the illustrated embodiment, one such separating mechanism 78 is a bending mechanism 80 configured to apply a bending force to the free portion 70 of the material segment 16 to at least partially separate at least a portion of the backing film 26 from the material layer 20 of the material segment 16. It should be understood that the bending force applied by the bending mechanism 80 may also at least partially separate at least a portion of the backing film 22 from the material layer 20 of the material segment 16. In the illustrated embodiment, the bending mechanism 80 comprises a flicking mechanism 81 configured to flick the free portion 70 of the material segment 16 when the material segment 16 is secured in the cantilevered position between the end effector 12 and the support assembly 60. For example, in the illustrated embodiment, the flicking mechanism 81 comprises a lever 82. A first end 84 of the lever 82 is coupled to a rotatable support element 86, and second end 88 of the lever 82 distal to the first end 84 is unsupported and extends outwardly toward the material segment 16 when the flicking mechanism 81 is positioned in a separating position relative to the material segment 16 (i.e., when the flicking mechanism 81 is positioned such that the lever 82 is aligned with the free portion 70 of the material segment 16 and can contact the free portion 70). The flicking mechanism 81 comprises an actuator 90 configured to cause rotational movement of the support element 86, thereby causing corresponding rotating movement of the lever 82 such that the second end 88 follows an arcuate path 92 in proximity to the free portion 70. The actuator 90 is controlled to cause a repeating, reversing directional movement of the support element 86 such that the second end 88 of the lever 82 makes repeated contact with the free portion 70 from opposite sides of the free portion 70 (e.g., contacting the backing film 26 when moving upwardly, and contacting the backing film 22 when moving downwardly). In exemplary embodiments, the flicking mechanism 81 may be movably coupled to a rail assembly 94 to facilitate translational movement of the flicking mechanism 81 (e.g., along the axis Y direction) relative to the support assembly 60 to enable the lever 82 to be selectively positioned relative to the material segment 16 (e.g., positioned in alignment with the material segment 16 for contacting the material segment 16 or moved away from the material segment 16 to facilitate the placement of another component of system proximate to the material segment 16).

Thus, embodiments of the present disclosure take advantage of the differences in stiffness between the backing film 26 and the material layer 20 to create a local delamination or separation of the backing film 26 from the material layer 20 through bending. As described above, this difference in stiffness may also be applicable between the backing film 22 and the material layer 20 such that the bending force also causes a local delamination or separation of at least a portion of the backing film 22 from the material layer 20. In the illustrated embodiment, the bending force is applied via the lever 82 of the flicking mechanism 81. However, it should be understood that the bending mechanism 80 may comprise other types of contact and non-contact mechanisms to apply a bending force to the free portion 70 of the material segment 16 (e.g., pneumatic systems directing a pressurized fluid to one or more sides or surfaces of the free portion 70 material segment 16, other types of mechanical mechanisms such as linear or rotating systems comprising one or more arms, pistons, cams, levers, plungers, etc., that contact the free portion 70 of the material segment 16).

In operation, the flicking mechanism 81 is positioned in alignment with the free portion 70 of the material segment 16 and actuated to cause the lever 82 to strike or flick the free portion 70 of the material segment 16 one or more times (e.g., striking the material segment 16 on the backing film 22 or the backing film 26). The actuation of the flicking mechanism 81 and contact of the lever 82 with the free portion 70 of the material segment 16 is configured to cause a separation or delamination of at least a portion 136 the backing film 26 from the material layer 20 in the region of the free portion 70 of the material segment 16. As described above, the actuation of the flicking mechanism 81 and contact of the lever 82 with the free portion 70 of the material segment 16 may also cause a separation or delamination of at least a portion 134 of the backing film 22 from the material layer 20 in the region of the free portion 70 of the material segment 16.

Figures 2, 3:
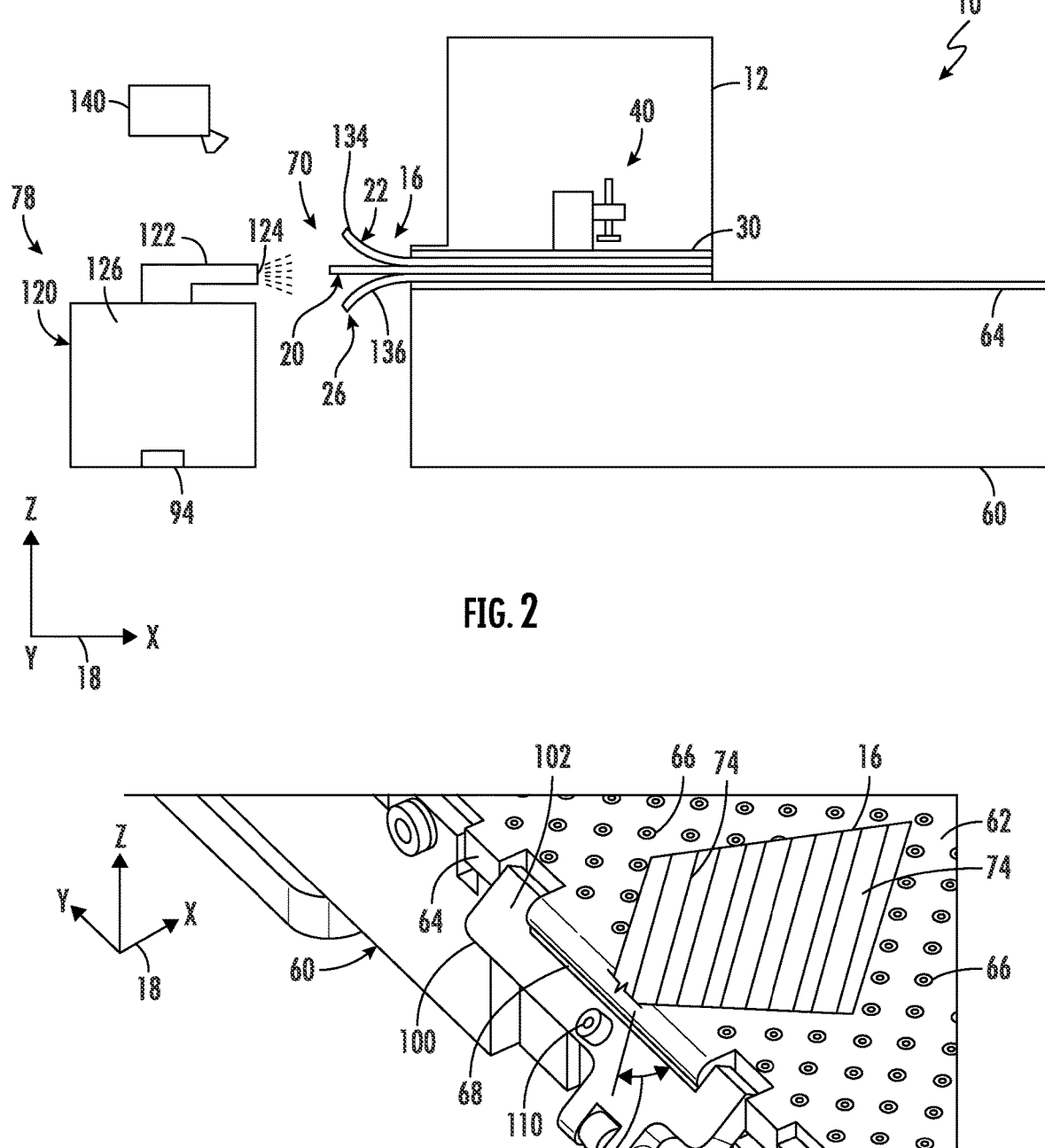
FIG. 2 is a schematic view of another component of the exemplary system for automatic film removal of FIG. 1 according to the present disclosure.
FIG. 3 is a schematic view of the exemplary system for automatic film removal of FIG. 1 according to the present disclosure viewed from the line 3-3 of FIG. 1.

Referring to FIG. 2, FIG. 2 is a schematic view of another component of the exemplary system 10 for automatic film removal of FIG. 1 according to the present disclosure. In the illustrated embodiment, system 10 also comprises another separating mechanism 78 in the form of a fluid ejector 120 configured to eject a fluid therefrom toward the free portion 70 of the material segment 16. For example, in the illustrated embodiment, the fluid ejector 120 comprises a nozzle 122 having an opening 124. The fluid ejector 120 is coupled to a fluid source 126 to enable a pressurized fluid to be ejected from the nozzle 122 via the opening 124. In exemplary embodiments, the fluid ejector 120 is positionable such that the opening 124 may direct a fluid toward the material segment 16. For example, in exemplary embodiments, the fluid ejector 120 is locatable adjacent the free portion 70 such that the opening 124 is positioned facing the free portion 70 of the material segment 16. In the illustrated embodiment, the fluid ejector 120 is also coupled to the rail assembly 94 to enable translatable movement of the fluid ejector 120 relative to the support assembly 60 to enable the fluid ejector 120 to be selectively positioned adjacent the free portion 70 of the material segment 16. Thus, in exemplary embodiments, the fluid ejector 120 may be moved to a position adjacent to and facing the free portion 70 and be moved away from the free portion 70. Thus, the flicking mechanism 81 (FIG. 1) and the fluid ejector 120 may be alternately positioned adjacent the free portion 70 of the material segment.

In exemplary embodiments, after use of the bending mechanism 80 (FIG. 1) to cause an initial at least partial separation of the backing film 26 from the material layer 20, the bending mechanism 80 (FIG. 1) may be replaced by the fluid ejector 120. For example, in exemplary embodiments, the bending mechanism 80 (FIG. 1) may be moved away from the material segment 16 (e.g., using the rail assembly 94 (FIG. 1)) and the fluid ejector 120 moved into alignment with the material segment 16 (e.g., using the rail assembly 94). In operation, a fluid (e.g., a pressurized air stream or another type of fluid) is ejected from the nozzle 122 toward the free portion 70 of the material segment 16. The fluid ejected from the nozzle 122 is configured to further separate or confirm the separation of the portion 136 of the backing film 26 from the material layer 20 in the region of the free portion 70 of the material segment 16. For example, in exemplary embodiments, the fluid ejector 120 may be used in connection with an imaging system 140 configured to capture one or more images of the material segment 16 while the fluid is being ejected from the nozzle 122 toward the free portion 70 of the material segment 16. The captured images may be analyzed by a computing system, a user, or otherwise to verify at least a partial separation of the backing film 26 from the material layer 20 in the free portion 70. It should be understood that in exemplary embodiments, the fluid ejector 120 may be omitted from the system 10 such that separation of the backing film 26 from the material layer 20 is performed solely by the bending mechanism 80. It should also be understood that the imaging system 140 may be utilized during use of the bending mechanism 80 to verify separation of the backing film 26 from the material layer 20. Similarly to as described above in connection with the bending mechanism 80 (FIG. 1), the fluid ejector 120 may also cause a separation, or cause to further separate, the portion 134 of the backing film 22 from the material layer 20 in the region of the free portion 70. Additionally, if desired, the imaging system 140 may also be utilized to verify or confirm at least a partial separation of the backing film 22 from the material layer 20.

Referring to FIG. 3, FIG. 3 is a schematic view of the support assembly 60 of FIG. 1 according to the present disclosure viewed from the line 3-3 of FIG. 1. For ease of description and illustration, the end effector 12 (FIG. 1) is omitted from view in FIG. 3, and a portion of the material segment 16 that would otherwise extend over or beyond the edge 68 is depicted broken away to better illustrate various features of the support assembly 60. In the illustrated embodiment, the support assembly 60 includes a top surface 62 configured in the form of the vacuum platen 64 having one or more vacuum ports 66. As will be described in greater detail below, a vacuum may be applied through the vacuum platen 64 via the one or more vacuum ports 66 to retain the material segment 16 against the top surface 62 of the support assembly 60 (i.e., against the vacuum platen 64).

In exemplary embodiments, the material segment 16 is positioned on the support assembly 60 such that a fiber direction 74 of the material segment 16 is orientated non-parallel to the edge 68 of the vacuum platen 64. For example, in exemplary embodiments, the fiber direction 74 of the material segment 16 is orientated at an angle 76 relative to the edge 68 of the vacuum platen 64 from between forty-five degrees to ninety degrees (i.e., from forty-five degrees to perpendicular). In exemplary embodiments, the fiber direction 74 of the material segment 16 is orientated relative to the edge 68 of the vacuum platen 64 where the angle 76 is between thirty degrees to ninety degrees. It should be understood that the fiber direction 74 is oriented relative to the edge 68 of the vacuum platen 64 in a non-parallel manner to prevent undesired fiber delamination of the material segment 16 and to accentuate the stiffness mismatch between the material layer 20 and at least one of the backing films 22 or 26.

In the embodiment illustrated in FIG. 3, the support assembly 60 comprises an arm 100 rotatably coupled to the vacuum platen 64 proximate to the edge 68 such that a top surface 102 of the arm 100 is positionable adjacent or in contact with the material segment 16. For example, in the illustrated embodiment, the arm 100 is rotatably coupled to the vacuum platen 64 to enable the arm 100 to move upwardly and downwardly relative to the edge 68. One or more linkages 106 are coupled to the arm 100 to selectively cause the upward and downward movement of the arm 100 relative to the edge 68 via an actuator 108 coupled to the one or more linkages 106. The arm 100 is configured having a length extending along a longitudinal direction of at least a portion of the edge 68 (e.g., in the axis Y direction) and a width extending outwardly away from at least a portion of the edge 68 (e.g., in the axis X direction) to enable the top surface 102 of the arm 100 to be selectively positionable adjacent to or in contact with the free portion 70 of the material segment 16. Additionally, actuation of the actuator 108 may cause the top surface 102 of the arm to retract downwardly in a direction away from the free portion 70. In exemplary embodiments, the arm 100 includes at least one vacuum port 110 located on the top surface 102 of the arm 100 through which a vacuum pressure can be selectively applied (e.g., via actuation of the vacuum source 130 (FIG. 1) fluidically coupled to the vacuum port 110). Although a single vacuum port 110 is illustrated, it should be understood that multiple vacuum ports 110 may be used.

Figure 4:
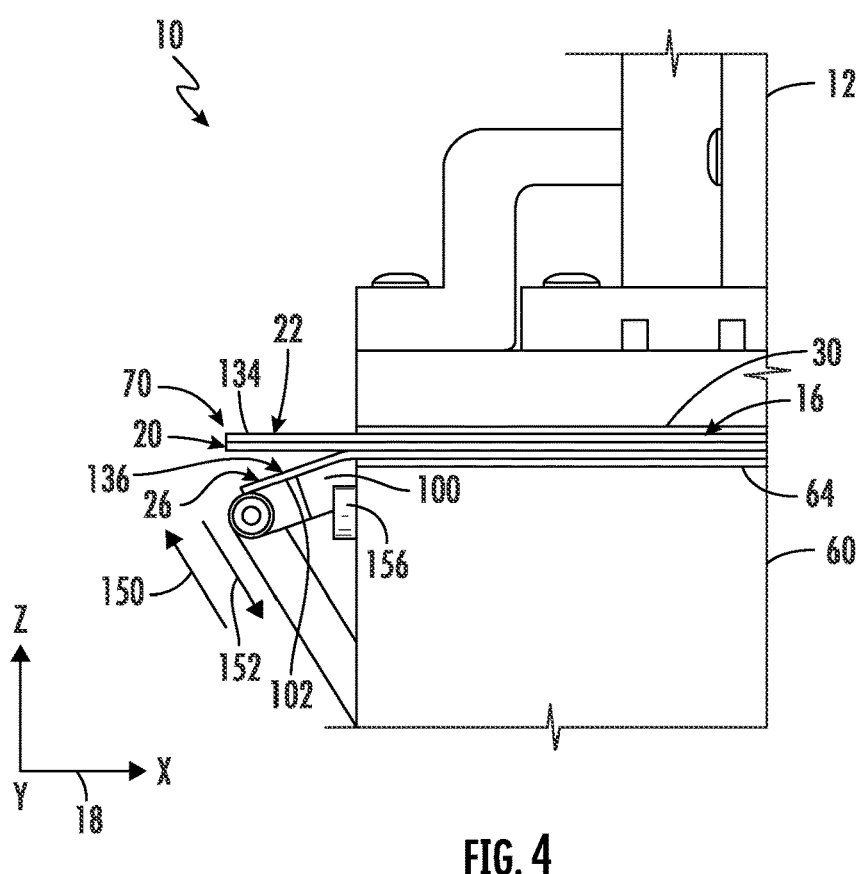
FIG. 4 is a close-up schematic view of the exemplary system for automatic film removal of FIG. 1 according to the present disclosure.

Referring to FIG. 4, FIG. 4 is a close-up schematic view of the exemplary system 10 for automatic film removal of FIGS. 1-3 according to the present disclosure at a particular stage of the backing film removal process. In exemplary embodiments, after at least the portion 136 of the backing film 26 is separated from the material layer 20 (e.g., using the bending mechanism 80 (FIG. 1) (alone or in combination with the fluid ejector 120 (FIG. 2))), arm 100 is actuated upwardly in a direction indicated by arrow 150 toward the free portion 70 of the material segment 16 until the top surface 102 of the arm 100 is disposed against or in close proximity to the backing film 26. The vacuum source 130 (FIG. 1) may be selectively controlled (e.g., by control valves or otherwise) or actuated to cause a vacuum to be applied through the vacuum port 110 (FIG. 3) on the top surface 102 of the arm 100. The vacuum may be applied through the vacuum port 110 (FIG. 3) before movement of the arm 100 toward the backing film 26, while the arm 100 is moving upwardly toward the backing film 26, or upon reaching a designated position proximate the backing film 26 (e.g., when near or in contact with the backing film 26). The vacuum applied through the vacuum port 110 (FIG. 3) is configured to cause the portion 136 of the backing film 26 to adhere to the top surface 102 of the arm 100. After movement of the arm 100 upwardly toward the material segment 16 and the application of the vacuum through the vacuum port 110 (FIG. 3), the arm 100 is moved downwardly away from the from the material layer 20 in a direction indicated by an arrow 152 such that the portion 136 of the backing film 26 is pulled away from the material layer 20 by the arm 100. For example, the vacuum applied through the vacuum port 110 (FIG. 3) retains the portion 136 of the backing film 26 against the top surface 102 of the arm 100. Thus, the support assembly 60 is configured to draw the portion 136 of the backing film 26 away from the material layer 20 such that the portion 136 of the backing film 26 is retained in a position spaced apart from the material layer 20.

In exemplary embodiments, system 10 is configured to verify that the portion 136 of the backing film 26 has been separated from the material layer 20. For example, in exemplary embodiments, the imaging system 140 (FIG. 2) may be used to verify that the portion 136 of the backing film 26 has been separated from the material layer 20 and is adhered to the top surface 102 of the arm 100 (e.g., via a processor performing image analysis on one or more images captured with the imaging system 140 (FIG. 2)). Additionally or alternatively, the system 10 may be configured to verify that the portion 136 of the backing film 26 has been separated from the material layer 20 and is adhered to the top surface 102 of the arm 100 based on an increased vacuum pressure detected via the vacuum port 110 (FIG. 3) (e.g., via a processor measuring or analyzing a vacuum pressure being pulled through the vacuum port 110 (FIG. 3) compared to a known, predetermined, or expected vacuum pressure without the backing film 26 being adhered to the top surface 102 of the arm 100). In exemplary embodiments, an optical proximity sensor 156 may be used to verify that the portion 136 of the backing film 26 has been separated from the material layer 20 and is adhered to the top surface 102 of the arm 100 by detecting a location of the portion 136 relative to the arm 100.

Figure 5:
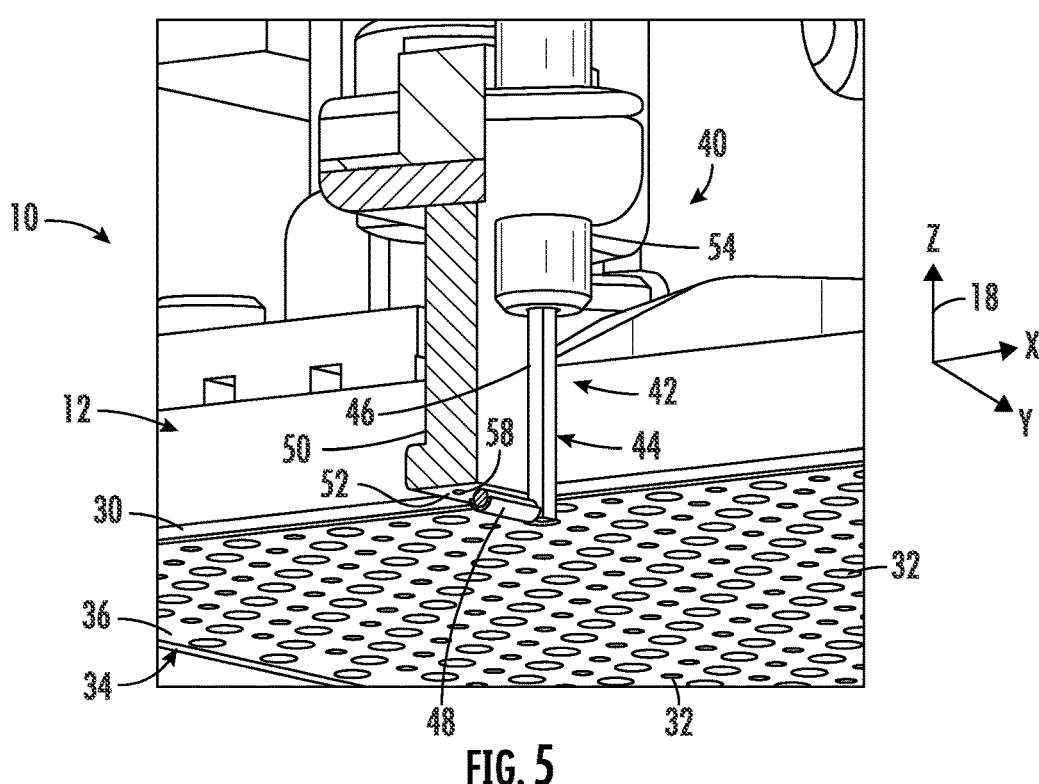
FIG. 5 is a schematic view of the exemplary system for automatic film removal of FIG. 1 according to the present disclosure viewed from the line 5-5 of FIG. 1.

Referring to FIG. 5, FIG. 5 is a schematic view of the end effector 12 of FIG. 1 according to the present disclosure viewed from the line 4-4 of FIG. 1. In the illustrated embodiment, the end effector 12 comprises the vacuum platen 30 comprising one or more vacuum ports 32 disposed on an end 34 of the end effector 12 facing the material segment 16 (e.g., on a downwardly facing end face 36 of the vacuum platen 30). As described above, a vacuum may be applied through the vacuum platen 30 via the one or more vacuum ports 32 (e.g., via the vacuum source 132 (FIG. 1)) to retain the material segment 16 against the end face 36 of the end effector 12 (i.e., against the vacuum platen 30).

In the illustrated embodiment, the end effector 12 also comprises the clamping mechanism 40. In exemplary embodiments, the clamping mechanism 40 comprises a clamping device 42 in the form of a finger gripper 44. In the illustrated embodiment, the finger gripper 44 comprises an L-shaped finger gripper 44 having a vertical leg 46 and a horizontal leg 48 extending outwardly from the vertical leg 46. In exemplary embodiments, the finger gripper 44 is movable in at least two degrees of freedom to enable the finger gripper 44 to be moved into various positions relative to the material segment 16. For example, in the illustrated embodiment, the clamping mechanism 40 also comprises a clamping bar 50 defining a clamping surface 52 facing downwardly (e.g., facing in the same direction as the end face 36). The end effector 12 includes an actuator 54 configured to provide rotational and translational movement of the finger gripper 44 relative to the clamping bar 50. For example, in the illustrated embodiment, the actuator 54 is configured to translationally move the finger gripper 44 in the vertical direction (e.g., in a direction corresponding to a longitudinal axis of the vertical leg 46, also corresponding to the Z axis of the coordinate system 18) and rotate the finger gripper 44 about the longitudinal axis of the vertical leg 46. Thus, in exemplary embodiments, rotation of the finger gripper 44 about the longitudinal axis of the vertical leg 46 causes rotation of the horizontal leg 48 within a horizontal plane (e.g., in a plane parallel to the end face 36 of the vacuum platen 30 (e.g., about a plane formed by the X and Y axes of the coordinate system 18)). Such movement of the horizontal leg 48 resulting from the rotational movement of the finger gripper 44 enables the horizontal leg 48 to be selectively disposed opposite the clamping surface 52. With the horizontal leg 48 disposed opposite the clamping surface 52, vertical or upward movement of the finger gripper 44 in a direction corresponding to the longitudinal axis of the vertical leg 46 causes the horizontal leg 48 to correspondingly move toward the clamping surface to facilitate the clamping of an object (e.g., the material segment 16) between the horizontal leg 48 and the clamping surface 52. The finger gripper 44 may also be rotated and moved vertically to place the horizontal leg 48 in a position above the end face 36 to avoid interference of the finger gripper 44 with other components of the system 10. In exemplary embodiments, the clamping surface 52 may comprise at least one vacuum port 58 through which a vacuum may be applied (e.g., via actuation of the vacuum source 132 (FIG. 1) fluidically coupled to the vacuum port 58) to further secure an object (e.g., the material segment 16) to the clamping surface 52. It should be understood that exemplary embodiments of the end effector 12 may comprise the finger gripper 44 without the vacuum port 58, the finger gripper 44 with the vacuum port 58, or the vacuum port 58 without the finger gripper 44.

Figure 6:
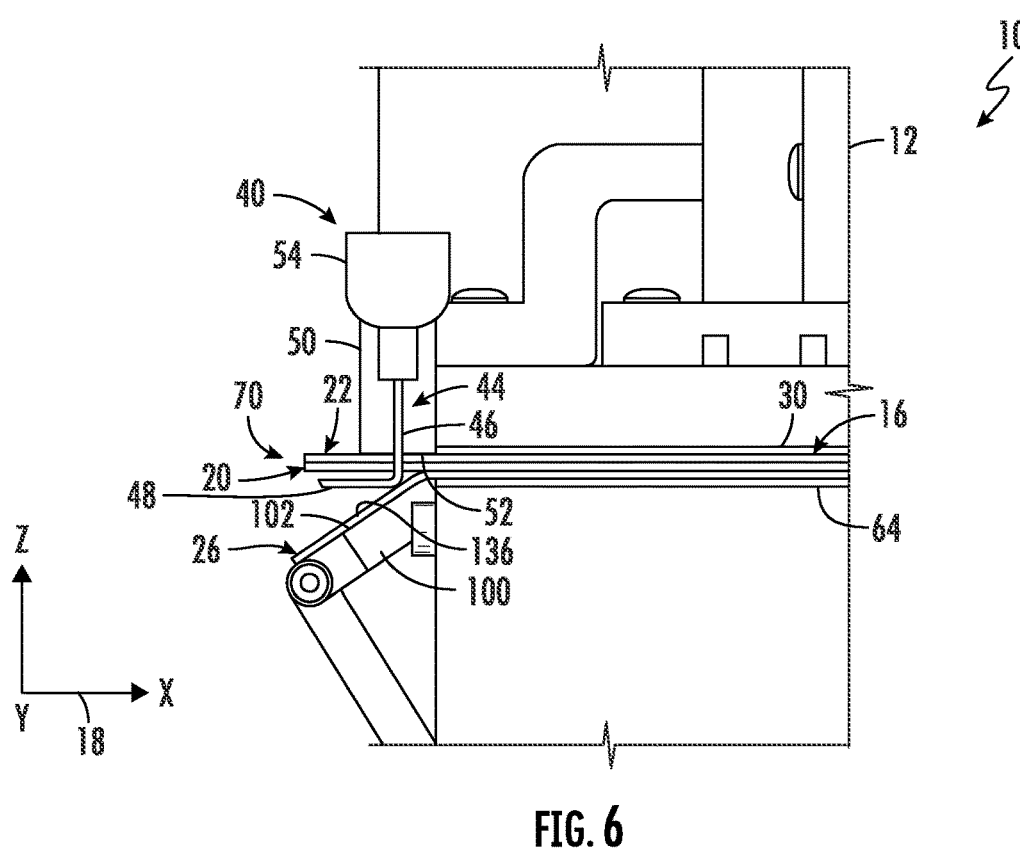
FIG. 6. is a close-up, schematic view of the exemplary system for automatic film removal of FIG. 1 according to the present disclosure
Figure 7:
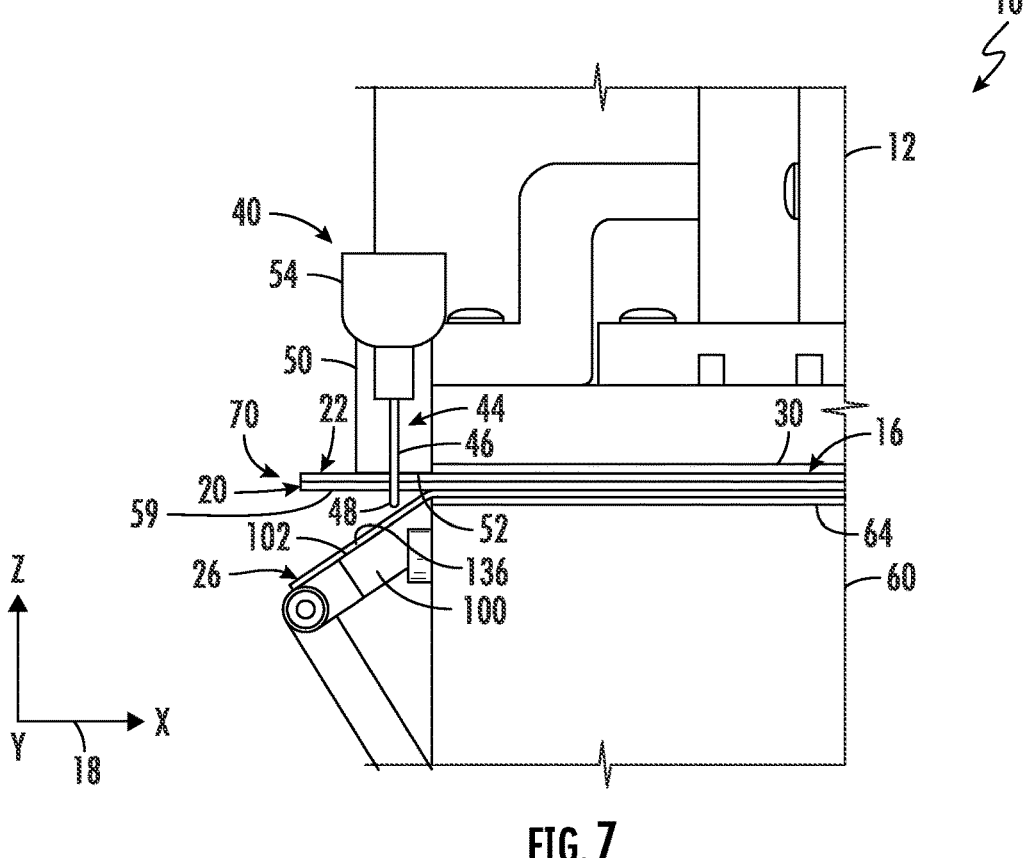
FIG. 7 is a close-up, schematic view of the exemplary system for automatic film removal of FIG. 1 according to the present disclosure.

Referring to FIGS. 6 and 7, FIGS. 6 and 7 are close-up schematic views of the exemplary system 10 for automatic film removal of FIGS. 1-5 according to the present disclosure depicting the use or operation of the end effector 12 and the support assembly 60 at further stages of the backing film removal process. For example, after the portion 136 of the backing film 26 has been separated from the material layer 20 and is adhered to the top surface 102 of the arm 100 as depicted in FIG. 4, the end effector 12 is lifted upwardly (e.g., in the axis Z direction) away from the material segment 16, rotated ninety degrees clockwise about the axis Z from the position depicted in FIG. 1 to the position depicted in FIG. 6, and lowered (e.g., in the axis Z direction) toward the support assembly 60 to return the end effector 16 to a position against the material segment 16 (only the returned position of the end effector depicted in FIG. 6). This lifting, rotation, and downward movement of the end effector 12 causes the clamping mechanism 40 to be moved to a position proximate to the free portion 70 of the material segment 16. In exemplary embodiments, if the vacuum through the vacuum platen 30 is currently active, such vacuum may be discontinued prior to the end effector 12 being lifted upwardly away from the material segment 16. Correspondingly, if the vacuum through the vacuum platen 64 is not active, such vacuum is applied to retain the material segment 16 in its current position against the support assembly 60 while the end effector 12 is repositioned relative to the material segment 16. In exemplary embodiments, after the end effector 12 has been repositioned as depicted in FIGS. 6 and 7, again having the material segment 16 disposed between the end effector 12 and the support assembly 60, the vacuum may be reapplied through the vacuum platen 30.

In operation, with the clamping mechanism 40 positioned proximate the free portion 70 of the material segment 16, the actuator 54 causes vertical, downward movement of the finger gripper 44 (e.g., in the axis Z direction or in the direction of the longitudinal axis of the vertical leg 46) to vertically position the horizontal leg 48 between the material layer 20 and the portion 136 of the backing film 26 (as best depicted in FIG. 6). The actuator 54 then causes rotational movement of the finger gripper 44 about the longitudinal axis of the vertical leg 46 to cause the horizontal leg 48 to be disposed between the material layer 20 and the portion 136 of the backing film 26 (as best depicted in FIG. 7). The actuator 54 then causes vertical, upward movement of the finger gripper 44 (e.g., in the axis Z direction or in the direction of the longitudinal axis of the vertical leg 46) to retract the finger gripper 44 toward the material layer 20. Retraction of the finger gripper 44 causes the horizontal leg 48 of the finger gripper 44 to apply a clamping force against an exposed portion 59 of the material layer 20 (e.g., a portion of the material layer 20 no longer covered by the backing film 26). The clamping force applied by the finger gripper 44 clamps the material layer 20 and the backing film 22 (including the portion 134 of the backing film 22) against the clamping surface 52 of the clamping bar 50. In exemplary embodiments, at least the horizontal leg 48 of the finger gripper 44 is configured having a minimal cross-sectional area along its width (as opposed to a longitudinal length along an axis of the horizontal leg 48) to minimize an area of contact with the exposed portion 59 of the material layer 20. For example, in exemplary embodiments, the lateral width of the horizontal leg 48 may be less than five millimeters. However, it should be understood that the horizontal leg 48 may be configured having different lateral widths. Additionally, in exemplary embodiments, the positioning of the horizontal leg 48 between the exposed portion 59 of the material layer 20 and the portion 136 of the backing film 26 maintains a separation of the portion 136 from the material layer 20. After the material layer 20 and the backing film 22 have been clamped against the clamping surface 52 of the clamping bar 50, the vacuum applied through the vacuum port 110 of the arm 100 (FIGS. 3 and 4) may be discontinued (thereby releasing the backing film 26 from the top surface 102 of the arm 100 (FIG. 4)), and the arm 100 (FIG. 4) may be retracted away from the material segment 16 (e.g., retracted to an initial position). Any vacuum applied through the vacuum platen 64 may also be discontinued as the vacuum applied through the vacuum platen 30 retains the material segment 16 against the end face 36 (FIG. 5) of the end effector 12.

Figure 8:
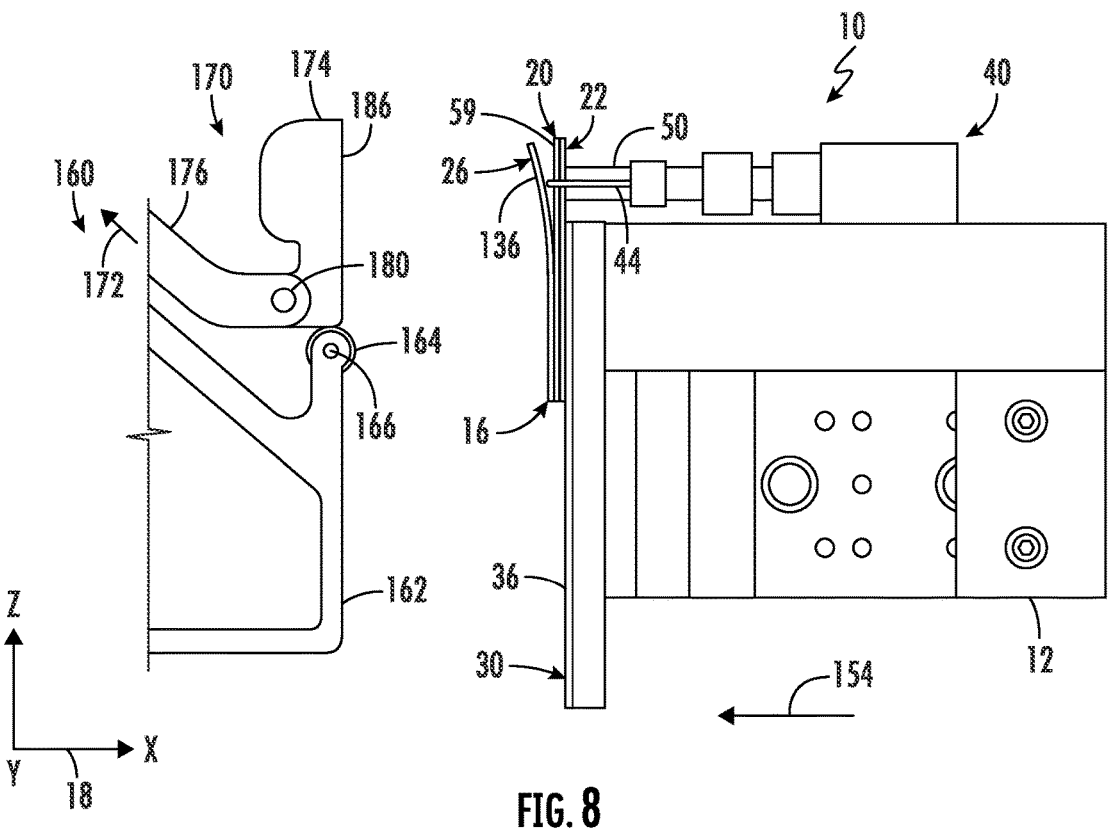
FIG. 8 is a schematic view of another component of the exemplary system for automatic film removal of FIG. 1 according to the present disclosure.

Referring to FIG. 8, FIG. 8 is a close-up, schematic view of the exemplary system 10 for automatic film removal of FIGS. 1-7 according to the present disclosure at a next stage of the backing ply removal process. As depicted in FIG. 8, the end effector 12 has been lifted vertically (e.g., in the direction of the axis Z) away from the support assembly 60 (FIGS. 1-4, 6, and 7) and has been rotated about ninety degrees clockwise about the axis Y with the material segment 16 adhered to the end face 36 of the end effector 12 via the vacuum applied through the vacuum platen 30. Additionally, the finger gripper 44 maintains a clamping force against the exposed portion 59 of the material layer 20 to secure the material layer 20 and the backing film 22 against the clamping bar 50. In the illustrated embodiment, the system 10 includes a separator assembly 160. The separator assembly 160 comprises a frame assembly 162 supporting a roller 164 being rotationally coupled to the frame assembly 162. The roller 164 extends laterally relative to a width-wise span of the frame assembly 162 (e.g., in the axis Y direction) and defines an axis 166 about which the roller 164 rotates. The separator assembly 160 also comprises a sled assembly 170 translationally coupled to the frame assembly 162 to enable translational movement of the sled assembly 170 relative to the frame assembly 162 in the direction indicated by arrow 172.

In the illustrated embodiment, the sled assembly 170 comprises a plate 174 rotatably coupled to the sled assembly 170. For example, in the illustrated embodiment, the sled assembly comprises a carriage 176. The plate 174 is rotatably coupled to the carriage 176 via a pin 180 or otherwise to enable rotation of the plate 174 relative to the carriage 176. In the illustrated embodiment, the plate 174 comprises an end face 186 disposed in a position to face the material segment 16 when the end effector 12 is positioned as depicted in FIG. 8. As will be described further below, the end effector 12 is then moved in a direction indicated by an arrow 154 (e.g., along the axis X) toward the separator assembly 160 to position the end effector 12, and the material segment 16, proximate the separator assembly 160. It should also be understood that, alternatively or additionally, the separator assembly 160 may be moved in a direction opposite the direction indicated by the arrow 154 (e.g., along the axis X) toward the end effector 12 to position the end effector 12, and the material segment 16, proximate the separator assembly 160.

Figure 9:
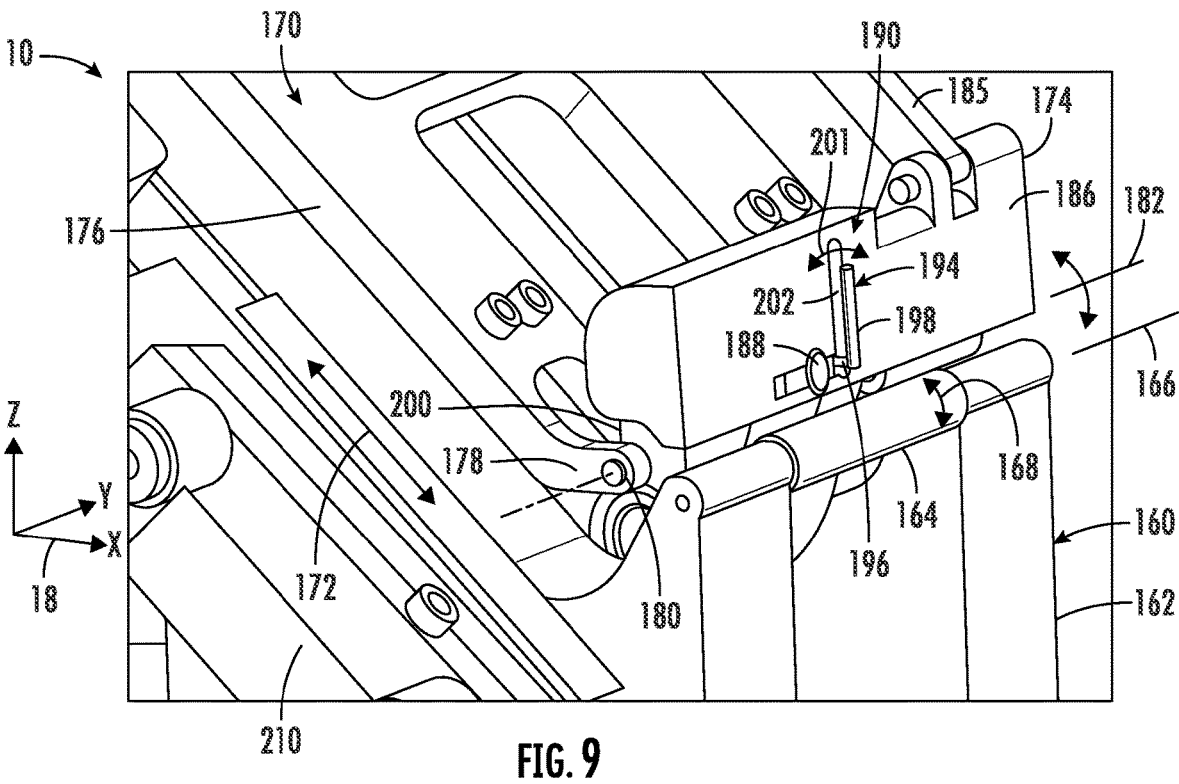
FIG. 9 is a close-up, schematic view of the exemplary system for automatic film removal of FIG. 1 according to the present disclosure.

Referring to FIG. 9. FIG. 9 is a close-up, schematic, isometric view of the separator assembly 160 according to the present disclosure. In exemplary embodiments, the separator assembly 160 comprises the frame assembly 162 supporting the roller 164 being rotationally coupled to the frame assembly 162. The roller 164 extends laterally relative to a width-wise span of the frame assembly (e.g., in the axis Y direction) and defines the axis 166 about which the roller 164 rotates, as indicated by an arrow 168. In the illustrated embodiment, the sled assembly 170 comprises the plate 174 rotatably coupled to the carriage 176 of the sled assembly 170. For example, in the illustrated embodiment, the carriage 176 has a pair of spaced apart arms 178 (only one shown in FIG. 9) with each arm 178 extending toward an opposite side of the plate 174. The plate 174 is rotatably coupled to the arms 178 via the pin 180 or otherwise to enable rotation of the plate 174 about an axis 182 defined by the pin 180, as indicated by an arrow 184. In the illustrated embodiment, the carriage 176 comprises one or more linkages 185 movably coupled to the plate 174 such that the linkages 185 may be utilized to cause the rotational movement of the plate 174 about the axis 182 (e.g., via an actuator (not shown) or otherwise). In exemplary embodiments, the end face 186 comprises at least one vacuum port 188.

In the illustrated embodiment, the sled assembly 170 also comprises a gripping mechanism 190. In exemplary embodiments, the gripping mechanism 190 is configured in the form of a finger gripper 194. In the illustrated embodiment, the finger gripper 194 comprises an L-shaped finger gripper 194 having a horizontal leg 196 and a vertical leg 198 extending outwardly from the horizontal leg 46. In exemplary embodiments, the finger gripper 194 is movable in at least two degrees of freedom to enable the finger gripper 194 to be moved into various positions relative to the end face 186. For example, in the illustrated embodiment, the horizontal leg 196 is extendable or translatable through the plate 174 in a direction corresponding to a longitudinal axis of the horizontal leg 196 (e.g., in the axis X direction), and the finger gripper 194 is rotatable about the longitudinal axis of the horizontal leg 196. The sled assembly 170 may comprise an actuator 200 configured to provide rotational and translational movement of the finger gripper 194 relative to the end face 186. Thus, in exemplary embodiments, rotation of the finger gripper 194 about the longitudinal axis of the horizontal leg 196 causes rotation of the vertical leg 198 within a vertical plane (e.g., in a plane parallel to the end face 186 of the plate 174 (e.g., about a plane formed by the Y and Z axes of the coordinate system 18 when the sled assembly 170 is positioned as depicted in FIG. 9)) as indicated by an arrow 201. Such movement of the vertical leg 198 resulting from the rotational movement of the finger gripper 194 enables the vertical leg 198 to be selectively disposed or positioned opposite the end face 186. In exemplary embodiments, the plate 174 also comprises a recess 202 disposed in the end face 186 to enable the finger gripper 194 to be retracted (e.g., translated along the longitudinal axis of the horizontal leg 196 inwardly toward the end face 186) to a position below the end face 186 (e.g., such that the vertical leg 198 does not extend outwardly beyond the end face 186). In exemplary embodiments, the separator assembly 160 also comprises a tensioner 210 configured to cause translational movement of the sled assembly 170 relative to the frame assembly 162 in the directions indicated by the arrow 172.

Figure 10:
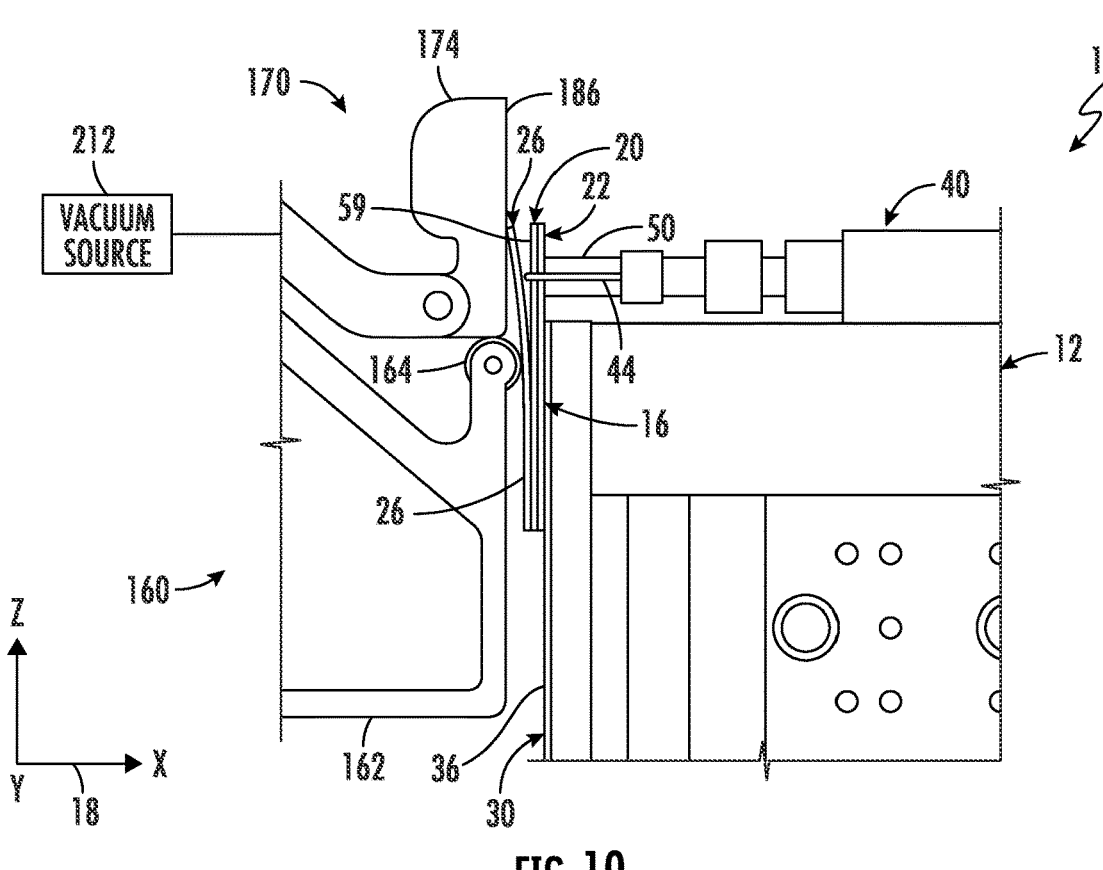
FIG. 10 is a schematic view of the exemplary system for automatic film removal of FIG. 1 according to the present disclosure.

Referring to FIG. 10, FIG. 10 is a schematic view of the separator assembly 160 and the end effector 12 of the system 10 depicting a further exemplary stage of film removal according to the present disclosure. In FIG. 10, the separator assembly 160 and the end effector 12 are disposed in close proximity to each other with the end face 186 of the plate 174 facing the end face 36 of the end effector 12. In exemplary embodiments, the end effector 12 is positioned such that the roller 164 of the sled assembly 170 is placed in contact with the backing film 26 and the portion 136 of the backing film 26 is located proximate the vacuum port 188 (FIG. 9) located on the end face 186 of the plate 174. In operation, a vacuum source 212 fluidically coupled to the vacuum port 188 (FIG. 9) is selectively actuated to apply a vacuum through the vacuum port 188 (FIG. 9) to thereby draw the portion 136 of the backing film 26 against the end face 186 of the plate 174. As indicated in FIG. 10, the clamping mechanism 40 of the end effector 12 maintains the material layer 20 and the backing film 22 in a clamped position against the clamping bar 50 (e.g., via the finger gripper 44 applying a clamping force against the exposed portion 59 of the material layer 20). As described earlier, vacuum applied through the vacuum platen 30 retains the material segment 16 against the end effector 12.

Figure 11:
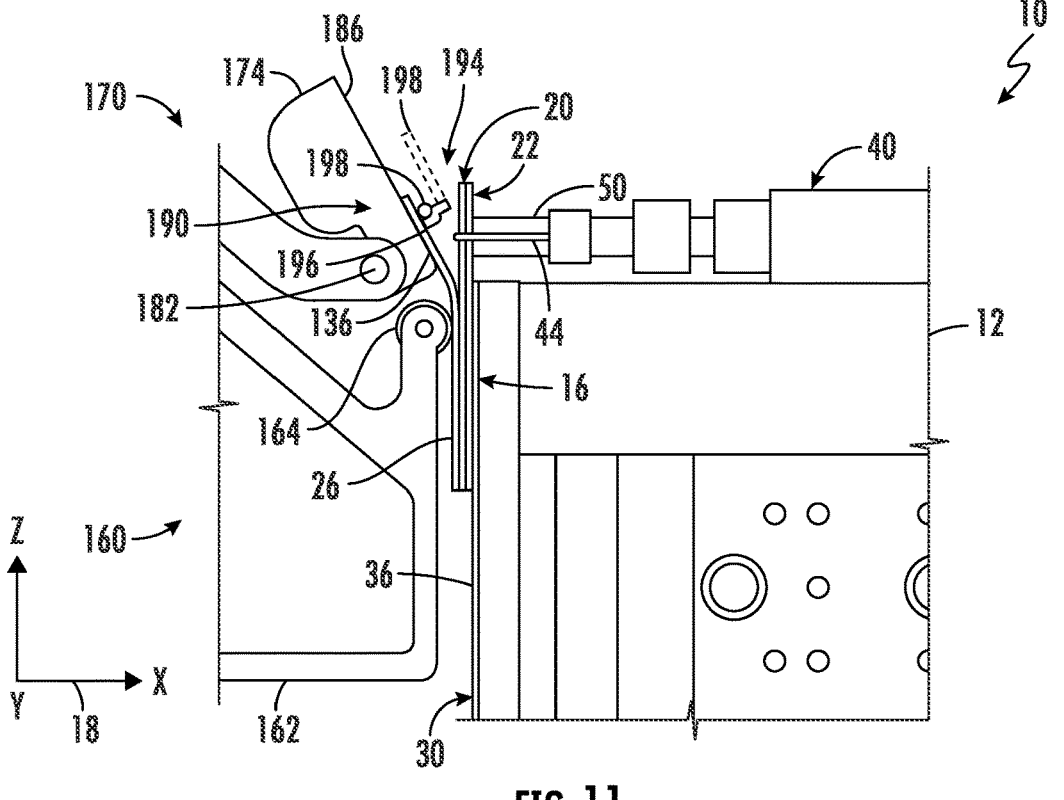
FIG. 11 is a schematic view of the exemplary system for automatic film removal of FIG. 1 according to the present disclosure.

Referring to FIG. 11, FIG. 11 is a schematic view of the separator assembly 160 and the end effector 12 of the system 10 depicting a further exemplary stage of film removal according to the present disclosure. In FIG. 11, after the portion 136 of the backing film 26 has been adhered against the end face 186 of the plate 174, the linkages 175 (FIG. 10) may be actuated to cause the plate 174 to rotate about the axis 182 in a direction away from the end effector 12, thereby causing the portion 136 of the backing film 26 to become further separated from the material layer 20. In exemplary embodiments, with the plate 174 rotated away from the end effector 12 as depicted in FIG. 11, the gripping mechanism 190 may be actuated to grip the portion 136 of the backing film 26 or otherwise clamp the portion 136 of the backing film 26 against the end face 186 of the plate 174. For example, in the illustrated embodiment, the finger gripper 194 may be extended outwardly from the recess 202 (FIG. 9) away from the end face 186 (e.g., by the actuator 200 (FIG. 9) by causing translational movement of the finger gripper 194 in a direction corresponding to the longitudinal axis of the horizontal leg 196) to position the vertical leg 198 away from or above the end face 186 (depicted in dashed lines in FIG. 11). The actuator 200 (FIG. 9) may thereafter rotate the finger gripper 194 about the longitudinal axis of the horizontal leg 196 to position the vertical leg 198 above and adjacent to the portion 136 of the backing film 26 and then retract the finger gripper 194 toward the end face 186 to grip or otherwise secure the portion 136 of the backing film 26 against the end face 186. For example, after extending the finger gripper 194 outward from the end face 186, the finger gripper 194 may be rotated in the direction indicated by the arrow 201 (FIG. 9) by approximately ninety degrees counterclockwise, then retracted inwardly toward the end face 186.

Figure 12:
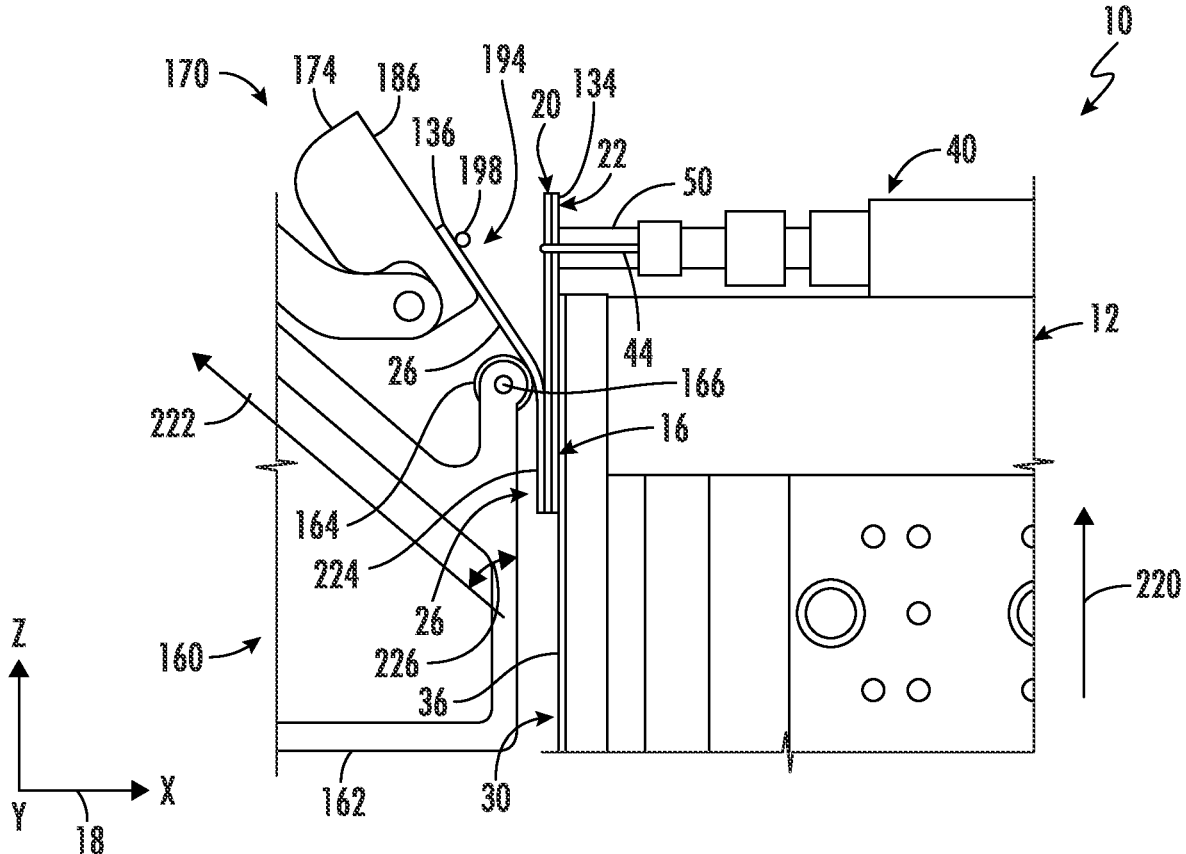
FIG. 12 is a schematic view of the exemplary system for automatic film removal of FIG. 1 according to the present disclosure.

Referring to FIG. 12, FIG. 12 is a schematic view of the separator assembly 160 and the end effector 12 of the system 10 depicting a further exemplary stage of film removal according to the present disclosure. In FIG. 12, after the portion 136 of the backing film 26 has been gripped by the finger gripper 194 of the separator assembly 160, at least one of the end effector 12 or the sled assembly 170 are moved in different directions relative to each other to remove a remaining portion 224 of the backing film 26 away from the material layer 20 for the remainder of the material segment 16. For example, the vacuum applied via the vacuum platen 30 of the end effector 12 and the clamping mechanism 40 retain the material layer 20 and the backing film 22 against the end effector 12. In exemplary embodiments, the end effector 12 is moved vertically upward (e.g., in the axis Z direction indicated by an arrow 220) concurrently while the sled assembly 170 is translated away from the end effector 12 in a direction indicated by an arrow 222. The movement of the sled assembly 170 (e.g., via the tensioner 210 (FIG. 9)) in the direction indicated by the arrow 222 provides a relatively constant force in an acute angular direction, indicated by an arrow 226, to a plane defined by the backing film 26 in the direction indicated by the arrow 222. The concurrent movement of the end effector 12 and the sled assembly 170 causes the backing film 26 to separate from the material layer 20 for a remainder of the material segment 16 until completely removed from the material segment 16. In the embodiment illustrated in FIG. 12, the sled assembly 170 is translated away from the end effector 12 at approximately a forty-five degree angle relative to the vertical axis Z. However, it should be understood that other angular directions may be used. Further, while backing film 26 is being removed from the material segment 16, the roller 164 maintains contact with at least a portion of the remaining portion 224 to ensure the material layer 20 and the backing film 22 remain secured against the end effector 12. For example, the roller 164 follows slightly behind the removed portions of the backing film 26 and applies a pressure against the backing film 26 in a location where the backing film 26 is still intact against the material layer 20. Thus, the roller 164 also prevents premature separation of the material layer 20 and the backing film 22 from the end face 36 of the end effector 12. Additionally, after the complete removal of the backing film 26 from the material segment 16, the vacuum applied through the vacuum platen 30 may be ceased and the clamping mechanism actuated to release the material layer 20 and the backing film 22 from their clamped position against the clamping bar 50. The material segment 16 comprising the material layer 20 and the backing film 22 may then be removed from the end effector 12 and applied to a component layup. As indicated above, it should also be understood that in exemplary embodiments, the end effector 12 may move in the direction 220 while the sled assembly 170 remains stationary, or the sled assembly 170 may move in the direction 222 while the end effector 12 remains stationary, to remove the remaining portion 224 of the backing film 26 from the material layer 20.

Additionally, because the portion 134 of the backing film 22 was previously at least partially separated from the material layer 20 (e.g., by the bending mechanism 80 (FIG. 1) alone or in combination with the fluid ejector 120 (FIG. 2)), the portion 134 of the backing film 22 may be easily grasped to facilitate the removal of the backing film 22 from the material segment 16. For example, although the end effector 12 could be used to grasp the portion 134 to remove the backing film 22 from the material layer 20, such as after layup (e.g., using a vacuum applied through the vacuum port 58 (FIG. 4), the finger gripper 44 (FIG. 4), each alone or in combination with each other), a different end effector could be used or a user may manually remove the backing film 22.

Figure 13:
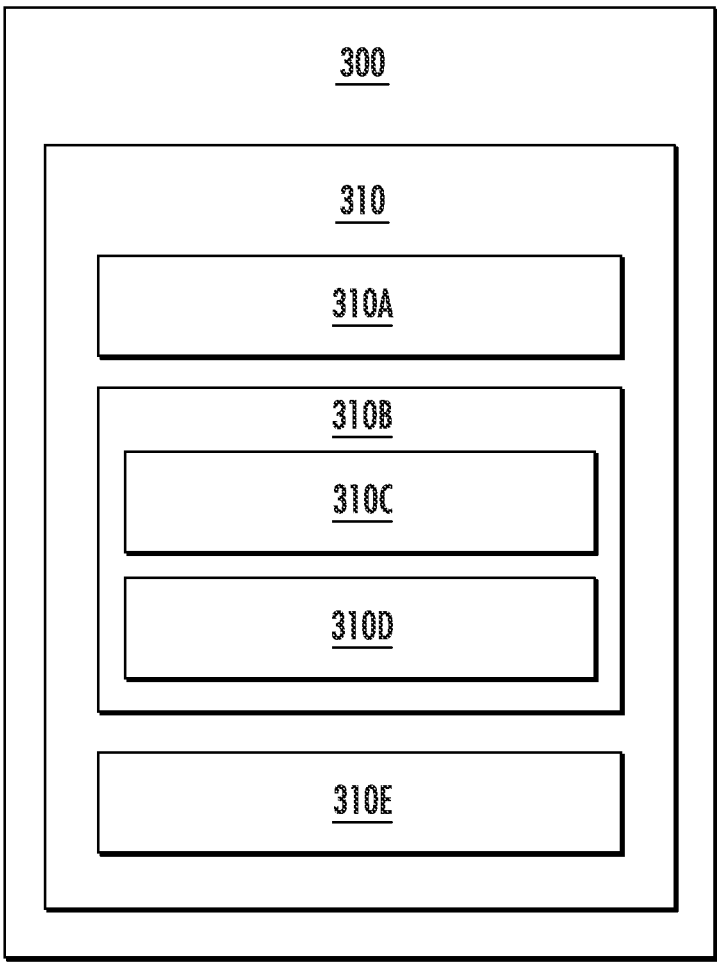
FIG. 13 is a block diagram of a computing system in accordance with various aspects of the present disclosure.

Referring now to FIG. 13, an example computing system 300 according to example embodiments of the present disclosure is depicted. The computing system 300 can be used, for example, to control various operations associated with the system 10 such as, but not limited to, controlling movements or operational aspects of the end effector 12, controlling movements or operational aspects of the bending mechanism 80, controlling movements or operational aspects of the fluid ejector 120, controlling movements or operational aspects of the separator assembly 160, controlling the operation or actuation of one or more of the vacuum sources 130, 132, or 212, for use as the imaging system 140 (or used with the imaging system 140), or for use with the proximity sensor 156. For example, the computing system 300 may be used as or with the imaging system 140 to analyze one or more images captured by the imaging system 140 to verify backing ply separation from the material layer (e.g., analyzing pixel data of the one or more captured images). The computing system 300 may also be used with the proximity sensor 156 to determine a position of the backing ply (e.g., with respect to the top surface 102 of the arm 100 (FIG. 4)). The computing system 300 can include one or more computing device(s) 310. The computing device(s) 310 can include one or more processor(s) 310A and one or more memory device(s) 310B. The one or more processor(s) 310A can include any suitable processing device, such as a microprocessor, microcontroller, integrated circuit, logic device, and/or other suitable processing device. The one or more memory device(s) 310B can include one or more computer-readable media, including, but not limited to, non-transitory computer-readable media, RAM, ROM, hard drives, flash drives, and/or other memory devices.

The one or more memory device(s) 310B can store information accessible by the one or more processor(s) 310A, including computer-readable instructions 310C that can be executed by the one or more processor(s) 310A. The instructions 310C can be any set of instructions that when executed by the one or more processor(s) 310A, cause the one or more processor(s) 310A to perform operations. In some embodiments, the instructions 310C can be executed by the one or more processor(s) 310A to cause the one or more processor(s) 310A to perform operations, such as any of the operations and functions for which the computing system 300 and/or the computing device(s) 310 are configured, the operations for operating the system 10, as described herein, and/or any other operations or functions of the one or more computing device(s) 310. Accordingly, the operations performed by the system 10 may be computer-implemented processes. The instructions 310C can be software written in any suitable programming language or can be implemented in hardware. Additionally, and/or alternatively, the instructions 310C can be executed in logically and/or virtually separate threads on processor(s) 310A. The memory device(s) 310B can further store data 310D that can be accessed by the processor(s) 310A. For example, the data 310D can include data indicative of vacuum pressures, image data, positional data, positional rate change data, or data indicative of operational parameters of the system 10.

The computing device(s) 310 can also include a network interface 310E used to communicate, for example, with the other components of system 300 (e.g., via a network). The network interface 310E can include any suitable components for interfacing with one or more network(s), including for example, transmitters, receivers, ports, controllers, antennas, and/or other suitable components. One or more external display devices (not depicted) can be configured to receive one or more commands from the computing device(s) 310, display one or more images captured with the imaging system 140 (e.g., to enable a user to visually verify backing ply separation from the material layer), or otherwise.

FIG. 14 provides a flow diagram of an exemplary method (500) for automatic film removal from a composite material segment in accordance with exemplary embodiments of the present disclosure. For instance, the exemplary method (500) may be utilized for automatically removing at least one backing film (e.g., the backing film 26) from a composite material segment 16 as described herein. It should be appreciated that the method (500) is discussed herein only to describe exemplary aspects of the present subject matter and is not intended to be limiting.

At (502), the method (500) includes securing the material segment 16 in a cantilevered position. At (504), the method (500) includes applying a bending force to the material segment 16 to at least partially separate at least a portion of the backing film 26 from the material layer 20 of the material segment 16. At (506), the method (500) includes verifying at least a partial separation of at least the portion 136 of the backing film 26 from the material layer 20 of the material segment 16.

At (508), the method (500) includes gripping the portion 136 of the backing film 26. At (510), method (500) includes securing the material layer 20 spaced apart from the separated portion 136 of the backing film 26. At (512), method (500) includes moving at least one of the gripped portion 136 of the backing film 136 or the secured material layer 20 in a different direction to remove the backing film 26 from the material layer 20 for the remainder of the material segment 16.

Thus, embodiments of the present disclosure provide systems and method for automatic backing film removal from a composite material segment. Embodiments of the present disclosure enable backing film removal without relying on a user attempting to physically grip a portion of the backing film. In exemplary embodiments, the present disclosure applies a bending force to a free portion of the material segment to take advantage of the different stiffnesses between the backing films and the material layer of the material segment to separate at least a portion of the backing films from the material layer. Embodiments of the present disclosure also apply various clamping or gripping mechanisms to prevent the unintended removal of a backing film from a certain side of the material segment (e.g., a side of the material segment opposite the side being laid up onto a composite component). Additionally, in exemplary embodiments, because portions of the backing film from both sides of the material segment are at least partially separated from the material layer, before or after layup of the material segment onto a composite component, the backing film from the opposite side may be easily removed. For example, a composite pre-impregnated material generally includes a backing film on each side of a resin impregnated material such that the backing films need to be removed prior to layup or, in some instances, post layup. The backing films are generally very thin, and the tackiness of the resin functions to hold the backing film against the material layer. Thus, because of the tacky nature of the pre-impregnated material layer, removal of the backing film is difficult and, if performed manually, may result in damage or contamination of the material layer, especially for smaller unidirectional materials with complex shapes. Thus, the automatic backing film removal system and method of the present disclosure facilitate backing film removal while preventing undesirable damage to the material layer during such removal.

Although specific features of various embodiments may be shown in some drawings and not in others, this is for convenience only. In accordance with the principles of the present disclosure, any feature of a drawing may be referenced and/or claimed in combination with any feature of any other drawing.

Further aspects of the disclosure are provided by the subject matter of the following clauses:

A backing film removal system, comprising: a separating mechanism configured to separate a first portion of a first backing film on a first side of a material segment and a second portion of a second backing film on a second side of the material segment from a material layer of the material segment while the material segment is retained in a cantilevered position, wherein the second side is opposite the first side; a clamping mechanism that is actuatable to apply a clamping force to secure the material layer and the second portion together; and a separator assembly having a gripping mechanism configured to grip the first portion, wherein at least one of the gripping mechanism or the clamping mechanism is movable to draw the first portion gripped by the gripping mechanism away from the material layer to remove a remaining portion of the first backing film from the material layer.

The backing film removal system of the preceding clause, further comprising a support assembly configured to draw and retain the first portion of the first backing film after separating.

The backing film removal system of any preceding clause, wherein the support assembly comprises an arm having at least one support assembly vacuum port fluidically coupled to a vacuum source from which a vacuum is selectively applied to the at least one support assembly vacuum port to secure the first portion spaced apart from the material layer.

The backing film removal system of any preceding clause, wherein the separator assembly comprises at least one separator assembly vacuum port fluidically coupled to a vacuum source, wherein the vacuum source is actuatable to selectively apply a vacuum through the at least one separator assembly vacuum port to adhere the first portion to the separator assembly.

The backing film removal system of any preceding clause, wherein the separating mechanism comprises at least one of: a bending mechanism configured to apply a bending force to the material segment; or a nozzle configured to discharge a fluid toward the material segment.

The backing film removal system of any preceding clause, further comprising an imaging system configured to capture one or more images of the material segment, and wherein the imaging system comprises at least one processor configured to analyze the one or more images to verify separation of the first portion from the material layer.

The backing film removal system of any preceding clause, wherein the clamping mechanism is coupled to an end effector, and wherein the end effector is configured to secure the material segment in a cantilevered position during the separating.

The backing film removal system of any preceding clause, wherein the separator assembly includes a roller, and wherein the separator assembly is configured to position the roller against the first backing film while the remaining portion of the first backing film is being removed from the material layer.

The backing film removal system of any preceding clause, wherein the separator assembly comprises: a frame assembly; a carriage moveably coupled to the frame assembly for selective translatable movement relative to the frame assembly; and a plate rotatably coupled to the carriage, and wherein the gripping mechanism is retractably coupled to the plate.

The backing film removal system of the preceding clause, further comprising an end effector configured to secure the material segment in a cantilevered position against a support assembly, and wherein the support assembly is configured to draw and retain the first portion spaced apart from the material layer.

The backing film removal system of any preceding clause, wherein the clamping mechanism comprises a clamping device and a clamping surface, and wherein the clamping device is movable to position the clamping device against the material layer to apply the clamping force to secure the material layer and the second portion together.

The backing film removal system of any preceding clause, further comprising an arm having a vacuum port fluidically coupled to a vacuum source, the arm movable toward the material segment, and wherein the vacuum source is actuatable to draw a vacuum through the vacuum port to secure the first portion to the arm.

The backing film removal system of any preceding clause, wherein the end effector comprises a vacuum platen to further secure the material segment to the end effector during removal of the remaining portion of the first backing film from the material layer.

The backing film removal system of any preceding clause, wherein the end effector comprises a vacuum platen comprising one or more vacuum ports.

The backing film removal system of any preceding clause, wherein the support assembly comprises a vacuum platen, the end effector securing the material segment in the cantilevered position between the end effector and the vacuum platen of the support assembly.

The backing film removal system of any preceding clause, wherein the vacuum platen of the support assembly comprises one or more vacuum ports.

The backing film removal system of any preceding clause, wherein the separator assembly moves in a first direction and the end effector moves in a second direction different than the first direction to draw the first portion gripped by the gripping mechanism away from the material layer.

The backing film removal system of any preceding clause, wherein the gripping mechanism and the end effector move concurrently to draw the first portion gripped by the gripping mechanism away from the material layer.

The backing film removal system of any preceding clause, wherein a free end of the material segment extends beyond an edge of the vacuum platen of the support assembly when the material segment is secured in the cantilevered position.

The backing film removal system of any preceding clause, wherein the material segment has a fiber direction, and wherein the material segment is secured in the cantilevered position wherein the fiber direction is non-parallel to the edge of the vacuum platen.

The backing film removal system of any preceding clause, wherein, with the material segment secured in the cantilevered position, the fiber direction is between forty-five degrees and ninety degrees relative to the edge of the vacuum platen.

The backing film removal system of any preceding clause, further comprising an imaging device, the imaging device configured to capture an image of a free end of the material segment to enable verification of separation of the first portion from the material layer.

The backing film removal system of any preceding clause, wherein the end effector secures the material segment between the end effector and a support assembly, and wherein the end effector is configured to transfer the material segment from the support assembly to a position proximate the separator assembly.

The backing film removal system of any preceding clause, wherein the clamping mechanism is configured to clamp the material layer and the second portion to the end effector during removal of the remaining portion of the first backing film from the material layer.

The backing film removal system of any preceding clause, wherein the end effector is disposed in a first position to secure the material segment in the cantilevered position, the end effector movable from the first position to a second position to clamp the material layer and the second portion to the end effector.

The backing film removal system of any preceding clause, wherein a vacuum is applied through the at least one vacuum port in the vacuum platen to retain the material segment against the vacuum platen while the end effector moves from the first position to the second position.

The backing film removal system of any preceding clause, wherein the bending mechanism comprises a flicking mechanism comprising a lever actuatable to contact the free portion of the material segment.

The backing film removal system of any preceding clause, wherein the separator assembly comprises: a frame assembly; a carriage translatably coupled to the frame assembly; and a plate rotatably coupled to the carriage, and wherein the gripping mechanism is retractably coupled to the plate.

The backing film removal system of any preceding clause, wherein the plate comprises at least one vacuum port through which a vacuum is selectively applied to draw the first portion to the plate.

The backing film removal system of any preceding clause, further comprising an optical proximity sensor configured to verify separation of the first portion from the material layer.

A method for removing a backing film from a material segment, the method comprising: securing the material segment with an end effector in a cantilevered position, the material segment comprising a material layer having a first backing film on a first side of the material layer and a second backing film on a second side of the material layer, the second side opposite the first side; separating, with a separating mechanism, a first portion of the first backing film and a second portion of the second backing film from the material layer; gripping the first portion with a gripping mechanism; applying a clamping force to an exposed portion of the material layer to clamp the material layer and the second portion to the end effector; and removing a remaining portion of the first backing film from the material layer by moving at least one of the gripping mechanism or the end effector to draw the first portion gripped by the gripping mechanism away from the material layer.

The method of the preceding clause, wherein the separating further comprises discharging a fluid toward the material segment to cause separation of the first portion and the second portion from the material layer.

The method of any preceding clause, further comprising: positioning an arm having at least one arm vacuum port proximate the first portion and spaced apart from the material layer; and drawing a vacuum through the at least one arm vacuum port to secure the first portion to the arm.

The method of any preceding clause, further comprising verifying the first portion is secured to the arm based on at least one of: comparing a vacuum pressure pulled through the at least one arm vacuum port to a predetermined vacuum pressure; analyzing, via a processor, at least one image captured with an imaging system; or determining, via a proximity sensor, a location of the first portion with respect to the arm.

The method of any preceding clause, further comprising applying roller against the first backing film while the remaining portion of the first backing film is being removed from the material layer.

The method of any preceding clause, wherein the end effector comprises a clamping device configured to applying the clamping force to the exposed portion of the material layer, and further comprising: selectively placing the clamping device between the first portion and the exposed portion of the material layer; and retracting the clamping device against the exposed portion of the material layer to apply the clamping force to the exposed portion of the material layer.

The method of any preceding clause, further comprising discharging a fluid toward the material segment to cause separation of the first portion and the second portion from the material layer.

The method of any preceding clause, further comprising: positioning an arm having a vacuum port proximate the first portion; and applying a vacuum through the vacuum port to secure the first portion to the arm spaced apart from the material layer.

The method of any preceding clause, further comprising verifying separation of the first portion from the material layer based on at least one of a vacuum pressure or a captured image.

The method of any preceding clause, wherein the material segment is secured between the end effector and a vacuum platen, and further comprising positioning the material segment such that the free end of the material segment extends beyond an edge of the vacuum platen when the material segment is secured in the cantilevered position.

The method of any preceding clause, wherein the material segment has a fiber direction, and further comprising securing the material segment in the cantilevered position wherein the fiber direction is non-parallel to the edge of the vacuum platen.

The method of any preceding clause, further comprising securing the material segment in the cantilevered position wherein the fiber direction is between forty-five degrees and ninety degrees relative to the edge of the vacuum platen.

The method of any preceding clause, further comprising concurrently moving the gripping mechanism and the end effector to draw the first portion away from the material layer.

A backing film removal system, comprising: an end effector configured to secure a material segment in a cantilevered position, the material segment comprising a material layer having a first backing film on a first side of the material layer, and wherein the end effector comprises a clamping mechanism actuatable to secure the material layer to the end effector; at least one separating mechanism configured to separate a first portion of the first backing film from the material layer; and a separator assembly having at least one separator assembly vacuum port, the separator assembly configured to draw a vacuum through the at least one separator assembly vacuum port to draw the first portion away from the material layer, the separator assembly further comprising a gripping mechanism configured to grip the first portion, and wherein at least one of the gripping mechanism or the end effector is movable to draw the first portion gripped by the gripping mechanism away from the material layer.

The backing film removal system of any preceding clause, wherein the separator assembly comprises a roller, and wherein the separator assembly is configured to position the roller against the first backing film while the remaining portion of the first backing film is being removed from the material layer.

The backing film removal system of any preceding clause, wherein the end effector is configured to secure the material segment in the cantilevered position against a support assembly, and wherein the support assembly is configured to draw the first portion away from the material layer.

The backing film removal system of any preceding clause, wherein the clamping mechanism is selectively moveable to clamp against an exposed portion of the material layer to clamp the exposed portion of the material layer against the end effector.

The backing film removal system of any preceding clause, further comprising an imaging system configured to capture one or more images of the material segment, and wherein the imaging system comprises at least one processor configured to analyze the one or more images to verify separation of the first portion from the material layer.

A backing film removal system, comprising: an end effector configured to secure a material segment in a cantilevered position, the material segment comprising a material layer having a first backing film on a first side of the material layer, and wherein the end effector comprises a clamping mechanism; at least one separating mechanism configured to separate a first portion of the first backing film from the material layer, and wherein the clamping mechanism is actuatable to apply a clamping force to an exposed portion of the material layer to secure the material layer to the end effector; and a separator assembly having a gripping mechanism configured to grip the first portion, wherein the gripping mechanism and the end effector are movable in different directions to draw the first portion gripped by the gripping mechanism away from the material layer to remove a remaining portion of the first backing film from the material layer.

The backing film removal system of any preceding clause, wherein the separator assembly is configured to apply a pressure to the remaining portion while the remaining portion is being removed from the material layer.

The backing film removal system of any preceding clause, wherein the end effector configured to secure the material segment in the cantilevered position against a support assembly, and wherein the support assembly is configured to draw the first portion away from the material layer.

The backing film removal system of any preceding clause, wherein the end effector is configured to selectively place the clamping mechanism between the first portion and the material layer and retract the clamping mechanism against the exposed portion of the material layer to clamp the material layer against the end effector.

The backing film removal system of any preceding clause, further comprising at least one of an imaging system or optical sensor configured to verify separation of the first portion from the material layer.

A non-transitory computer readable medium comprising computer-executable instructions, which, when executed by one or more processors of a computing system, cause the one or more processors to: secure the material segment with an end effector in a cantilevered position wherein the material segment has a fixed portion and a free portion, the material segment comprising a material layer having a first backing film on a first side of the material layer and a second backing film on a second side of the material layer opposite the first side; apply a bending force to the free portion to separate a first portion of the first backing film from the material layer; grip the first portion with a sled assembly; grip the material layer and the second backing film with the end effector; and move at least one of the sled assembly or the end effector to draw the first portion gripped by the separator assembly away from the material layer to remove a remaining portion of the first backing film from the material layer.

The non-transitory computer readable medium of any preceding clause, wherein the computer-executable instructions, when executed by the one or more processors of the computing system, cause the one or more processors to, after applying the bending force to the free portion, discharge a fluid toward the free portion to cause separation of the first portion and the second portion from the material layer.

The non-transitory computer readable medium of any preceding clause, wherein the computer-executable instructions, when executed by the one or more processors of the computing system, cause the one or more processors to: move an arm having a vacuum port toward the free portion; and apply a vacuum through the vacuum port to secure the first portion to the arm.

The non-transitory computer readable medium of any preceding clause, wherein the computer-executable instructions, when executed by the one or more processors of the computing system, cause the one or more processors to verify the first portion is secured to the arm based on at least one of a vacuum pressure or a captured image.

The non-transitory computer readable medium of any preceding clause, wherein the computer-executable instructions, when executed by the one or more processors of the computing system, cause the one or more processors to: apply a vacuum through at least one vacuum port of the end effector to secure the material segment to the end effector; and move the end effector toward the separator assembly.

The non-transitory computer readable medium of any preceding clause, wherein the computer-executable instructions, when executed by the one or more processors of the computing system, cause the one or more processors to apply a pressure to the first backing film via a roller while the remaining portion of the first backing film is removed from the material layer.

The non-transitory computer readable medium of any preceding clause, wherein the material segment wherein the material segment is secured between the end effector and a vacuum platen, and wherein the computer-executable instructions, when executed by the one or more processors of the computing system, cause the one or more processors to apply a vacuum through at least one vacuum port of the vacuum platen to restrain the material segment against the vacuum platen.

The non-transitory computer readable medium of any preceding clause, wherein the computer-executable instructions, when executed by the one or more processors of the computing system, cause the one or more processors to: after verifying the first portion is separated from the material layer, move the end effector from a first position to a second position where the material segment is secured in the cantilevered position; and clamp the material layer and the second portion to the end effector with the end effector in the second position.

The non-transitory computer readable medium of any preceding clause, wherein the computer-executable instructions, when executed by the one or more processors of the computing system, cause the one or more processors to: after moving the end effector to the second position, actuate a vacuum on the end effector to secure the material segment to the end effector; and move the end effector from the second position to a third position adjacent the sled assembly.

The non-transitory computer readable medium of any preceding clause, wherein the computer-executable instructions, when executed by the one or more processors of the computing system, cause the one or more processors to apply a vacuum through a vacuum port disposed on the sled assembly to secure the first portion to the sled assembly.

The non-transitory computer readable medium of any preceding clause, wherein the computer-executable instructions, when executed by the one or more processors of the computing system, cause the one or more processors to: move the sled assembly in a first direction; and move the end effector in a second direction different than the first direction to draw the first portion away from the material layer.

The non-transitory computer readable medium of any preceding clause, wherein the computer-executable instructions, when executed by the one or more processors of the computing system, cause the one or more processors to concurrently move the sled assembly and the end effector to draw the first portion away from the material layer.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A backing film removal system, comprising:
a separating mechanism configured to separate a first portion of a first backing film on a first side of a material segment and a second portion of a second backing film on a second side of the material segment from a material layer of the material segment while the material segment is retained in a cantilevered position, wherein the second side is opposite the first side;
an end effector configured to secure the material segment in the cantilevered position, the end effector comprising a clamping mechanism that is actuatable to position at least a portion of the clamping mechanism between the first portion and the material layer to apply a clamping force to an exposed portion of the material layer to secure the material layer and the second portion together; and
a separator assembly having a gripping mechanism configured to grip the first portion, wherein at least one of the gripping mechanism or the end effector is movable to draw the first portion gripped by the gripping mechanism away from the material layer secured to the second portion to remove a remaining portion of the first backing film from the material layer.

2. The backing film removal system of claim 1, further comprising a support assembly configured to draw and retain the first portion of the first backing film after separating.

3. The backing film removal system of claim 2, wherein the support assembly comprises an arm having at least one support assembly vacuum port fluidically coupled to a vacuum source from which a vacuum is selectively applied to the at least one support assembly vacuum port to secure the first portion spaced apart from the material layer.

4. The backing film removal system of claim 1, wherein the separator assembly comprises at least one separator assembly vacuum port fluidically coupled to a vacuum source, wherein the vacuum source is actuatable to selectively apply a vacuum through the at least one separator assembly vacuum port to adhere the first portion to the separator assembly.

5. The backing film removal system of claim 1, wherein the separating mechanism comprises at least one of:
a bending mechanism configured to apply a bending force to the material segment; or
a nozzle configured to discharge a fluid toward the material segment.

6. The backing film removal system of claim 1, further comprising an imaging system configured to capture one or more images of the material segment, and wherein the imaging system comprises at least one processor configured to analyze the one or more images to verify separation of the first portion from the material layer.

7. The backing film removal system of claim 1, wherein the clamping mechanism is actuatable to position the portion of the clamping mechanism in contact with the exposed portion of the material layer.

8. The backing film removal system of claim 1, wherein the separator assembly includes a roller, and wherein the separator assembly is configured to position the roller against the first backing film while the remaining portion of the first backing film is being removed from the material layer.

9. The backing film removal system of claim 1, wherein the separator assembly comprises:

a frame assembly;

a carriage moveably coupled to the frame assembly for selective translatable movement relative to the frame assembly; and a plate rotatably coupled to the carriage, and wherein the gripping mechanism is retractably coupled to the plate.

10. A method for removing a backing film from a material segment, the method comprising:

securing the material segment with an end effector in a cantilevered position, the material segment comprising a material layer having a first backing film on a first side of the material layer and a second backing film on a second side of the material layer, the second side opposite the first side;

separating, with a separating mechanism, a first portion of the first backing film and a second portion of the second backing film from the material layer;

gripping the first portion with a gripping mechanism;

applying a clamping force to an exposed portion of the material layer to clamp the material layer and the second portion to the end effector; and removing a remaining portion of the first backing film from the material layer by moving at least one of the gripping mechanism or the end effector to draw the first portion gripped by the gripping mechanism away from the material layer.

11. The method of claim 10, wherein the separating further comprises discharging a fluid toward the material segment to cause separation of the first portion and the second portion from the material layer.

12. The method of claim 10, further comprising:

positioning an arm having at least one arm vacuum port proximate the first portion and spaced apart from the material layer; and drawing a vacuum through the at least one arm vacuum port to secure the first portion to the arm.

13. The method of claim 12, further comprising verifying the first portion is secured to the arm based on at least one of:

comparing a vacuum pressure pulled through the at least one arm vacuum port to a predetermined vacuum pressure;

analyzing, via a processor, at least one image captured with an imaging system; or determining, via a proximity sensor, a location of the first portion with respect to the arm.

14. The method of claim 10, further comprising applying roller against the first backing film while the remaining portion of the first backing film is being removed from the material layer.

15. The method of claim 10, wherein the end effector comprises a clamping device configured to applying the clamping force to the exposed portion of the material layer, and further comprising:

selectively placing the clamping device between the first portion and the exposed portion of the material layer; and retracting the clamping device against the exposed portion of the material layer to apply the clamping force to the exposed portion of the material layer.

16. A backing film removal system, comprising:

an end effector configured to secure a material segment in a cantilevered position, the material segment comprising a material layer having a first backing film on a first side of the material layer, and wherein the end effector comprises a clamping mechanism actuatable to position at least a portion of the clamping mechanism between the first backing film and the material layer to secure the material layer to the end effector;

at least one separating mechanism configured to separate a first portion of the first backing film from the material layer; and a separator assembly having at least one separator assembly vacuum port, the separator assembly configured to draw a vacuum through the at least one separator assembly vacuum port to draw the first portion away from the material layer, the separator assembly further comprising a gripping mechanism configured to grip the first portion, and wherein at least one of the gripping mechanism or the end effector is movable to draw the first portion gripped by the gripping mechanism away from the material layer.

17. The backing film removal system of claim 16, wherein the separator assembly comprises a roller, and wherein the separator assembly is configured to position the roller against the first backing film while the remaining portion of the first backing film is being removed from the material layer.

18. The backing film removal system of claim 16, wherein separator assembly comprises:

a frame assembly;

a carriage moveably coupled to the frame assembly for selective translatable movement relative to the frame assembly; and a plate rotatably coupled to the carriage, and wherein the gripping mechanism is retractably coupled to the plate.

19. The backing film removal system of claim 16, wherein the clamping mechanism is selectively moveable to clamp against an exposed portion of the material layer to clamp the exposed portion of the material layer against the end effector.

20. The backing film removal system of claim 16, further comprising an imaging system configured to capture one or more images of the material segment, and wherein the imaging system comprises at least one processor configured to analyze the one or more images to verify separation of the first portion from the material layer.

* * * * *